(12) United States Patent  
Mauer

(10) Patent No.: US 8,812,576 B1  
(45) Date of Patent: Aug. 19, 2014

(54) QR DECOMPOSITION IN AN INTEGRATED CIRCUIT DEVICE

(75) Inventor: Volker Mauer, Lacey Green (GB)

(73) Assignee: Altera Corporation, San Jose, CA (US)

( * ) Notice: Subject to any disclaimer, the term of this patent is extended or adjusted under 35 U.S.C. 154(b) by 479 days.

(21) Appl. No.: 13/229,820

(22) Filed: Sep. 12, 2011

(51) Int. Cl.
*G06F 7/38* (2006.01)

(52) U.S. Cl.
USPC .......................................... 708/520; 708/607

(58) Field of Classification Search
CPC ........................................................ G06F 17/16
USPC ......................................... 708/514, 520, 607
See application file for complete search history.

(56) References Cited

U.S. PATENT DOCUMENTS

| | | |
|---|---|---|
| 3,473,160 A | 10/1969 | Wahlstrom |
| 4,156,927 A | 5/1979 | McElroy et al. |
| 4,179,746 A | 12/1979 | Tubbs |
| 4,212,076 A | 7/1980 | Conners |
| 4,215,406 A | 7/1980 | Gomola et al. |
| 4,215,407 A | 7/1980 | Gomola et al. |
| 4,422,155 A | 12/1983 | Amir et al. |
| 4,484,259 A | 11/1984 | Palmer et al. |
| 4,521,907 A | 6/1985 | Amir et al. |
| 4,575,812 A | 3/1986 | Kloker et al. |
| 4,597,053 A | 6/1986 | Chamberlin |
| 4,616,330 A | 10/1986 | Betz |
| 4,623,961 A | 11/1986 | Mackiewicz |
| 4,682,302 A | 7/1987 | Williams |
| 4,718,057 A | 1/1988 | Venkitakrishnan et al. |
| 4,727,508 A | 2/1988 | Williams |
| 4,736,335 A | 4/1988 | Barkan |
| 4,777,614 A | 10/1988 | Ward |
| 4,791,590 A | 12/1988 | Ku et al. |
| 4,799,004 A | 1/1989 | Mori |
| 4,823,295 A | 4/1989 | Mader |

(Continued)

FOREIGN PATENT DOCUMENTS

| | | |
|---|---|---|
| EP | 0 158 430 | 10/1985 |
| EP | 0 380 456 | 8/1990 |

(Continued)

OTHER PUBLICATIONS

Chang et al.. "Iterative QR decomposition Architecture Using the Modified Gram-Schidt Algorithm for MIMO systems", IEEE, May 2010, pp. 1095-1102.*

(Continued)

*Primary Examiner* — Chuong D Ngo

(74) *Attorney, Agent, or Firm* — Ropes & Gray LLP; Jeffrey H. Ingerman

(57) ABSTRACT

Circuitry for performing QR decomposition of an input matrix includes multiplication/addition circuitry for performing multiplication and addition/subtraction operations on a plurality of inputs, division/square-root circuitry for performing division and square-root operations on an output of the multiplication/addition circuitry, a first memory for storing the input matrix, a second memory for storing a selected vector of the input matrix, and a selector for inputting to the multiplication/addition circuitry any one or more of a vector of the input matrix, the selected vector, and an output of the division/square-root circuitry. On respective successive passes, a respective vector of the input matrix is read from a first memory into a second memory, and elements of a respective vector of an R matrix of the QR decomposition are computed and the respective vector of the input matrix in the first memory is replaced with the respective vector of the R matrix.

20 Claims, 10 Drawing Sheets

(56) References Cited

U.S. PATENT DOCUMENTS

| | | |
|---|---|---|
| 4,839,847 A | 6/1989 | Laprade |
| 4,871,930 A | 10/1989 | Wong et al. |
| 4,912,345 A | 3/1990 | Steele et al. |
| 4,918,637 A | 4/1990 | Morton |
| 4,967,160 A | 10/1990 | Quievy et al. |
| 4,982,354 A | 1/1991 | Takeuchi et al. |
| 4,991,010 A | 2/1991 | Hailey et al. |
| 4,994,997 A | 2/1991 | Martin et al. |
| 5,073,863 A | 12/1991 | Zhang |
| 5,081,604 A | 1/1992 | Tanaka |
| 5,122,685 A | 6/1992 | Chan et al. |
| 5,128,559 A | 7/1992 | Steele |
| 5,175,702 A | 12/1992 | Beraud et al. |
| 5,208,491 A | 5/1993 | Ebeling et al. |
| RE34,363 E | 8/1993 | Freeman |
| 5,267,187 A | 11/1993 | Hsieh et al. |
| 5,296,759 A | 3/1994 | Sutherland et al. |
| 5,338,983 A | 8/1994 | Agarwala |
| 5,339,263 A | 8/1994 | White |
| 5,349,250 A | 9/1994 | New |
| 5,357,152 A | 10/1994 | Jennings, III et al. |
| 5,371,422 A | 12/1994 | Patel et al. |
| 5,375,079 A | 12/1994 | Uramoto et al. |
| 5,381,357 A | 1/1995 | Wedgwood et al. |
| 5,404,324 A | 4/1995 | Colon-Benet |
| 5,424,589 A | 6/1995 | Dobbelaere et al. |
| 5,446,651 A | 8/1995 | Moyse et al. |
| 5,451,948 A | 9/1995 | Jekel |
| 5,452,231 A | 9/1995 | Butts et al. |
| 5,452,375 A | 9/1995 | Rousseau et al. |
| 5,457,644 A | 10/1995 | McCollum |
| 5,465,226 A | 11/1995 | Goto |
| 5,465,375 A | 11/1995 | Thepaut et al. |
| 5,483,178 A | 1/1996 | Costello et al. |
| 5,497,498 A | 3/1996 | Taylor |
| 5,500,812 A | 3/1996 | Saishi et al. |
| 5,500,828 A | 3/1996 | Doddington et al. |
| 5,523,963 A | 6/1996 | Hsieh et al. |
| 5,528,550 A | 6/1996 | Pawate et al. |
| 5,537,601 A | 7/1996 | Kimura et al. |
| 5,541,864 A | 7/1996 | Van Bavel et al. |
| 5,546,018 A | 8/1996 | New et al. |
| 5,550,993 A | 8/1996 | Ehlig et al. |
| 5,559,450 A | 9/1996 | Ngai et al. |
| 5,563,526 A | 10/1996 | Hastings et al. |
| 5,563,819 A | 10/1996 | Nelson |
| 5,570,039 A | 10/1996 | Oswald et al. |
| 5,570,040 A | 10/1996 | Lytle et al. |
| 5,572,148 A | 11/1996 | Lytle et al. |
| 5,581,501 A | 12/1996 | Sansbury et al. |
| 5,590,350 A | 12/1996 | Guttag et al. |
| 5,594,366 A | 1/1997 | Khong et al. |
| 5,594,912 A | 1/1997 | Brueckmann et al. |
| 5,596,763 A | 1/1997 | Guttag et al. |
| 5,606,266 A | 2/1997 | Pedersen |
| 5,617,058 A | 4/1997 | Adrian et al. |
| 5,631,848 A | 5/1997 | Laczko et al. |
| 5,633,601 A | 5/1997 | Nagaraj |
| 5,636,150 A | 6/1997 | Okamoto |
| 5,636,368 A | 6/1997 | Harrison et al. |
| 5,640,578 A | 6/1997 | Balmer et al. |
| 5,644,519 A | 7/1997 | Yatim et al. |
| 5,644,522 A | 7/1997 | Moyse et al. |
| 5,646,545 A | 7/1997 | Trimberger et al. |
| 5,646,875 A | 7/1997 | Taborn et al. |
| 5,648,732 A | 7/1997 | Duncan |
| 5,652,903 A | 7/1997 | Weng et al. |
| 5,655,069 A | 8/1997 | Ogawara et al. |
| 5,664,192 A | 9/1997 | Lloyd et al. |
| 5,689,195 A | 11/1997 | Cliff et al. |
| 5,696,708 A | 12/1997 | Leung |
| 5,729,495 A | 3/1998 | Madurawe |
| 5,740,404 A | 4/1998 | Baji |
| 5,744,980 A | 4/1998 | McGowan et al. |
| 5,744,991 A | 4/1998 | Jefferson et al. |
| 5,754,459 A | 5/1998 | Telikepalli |
| 5,761,483 A | 6/1998 | Trimberger |
| 5,764,555 A | 6/1998 | McPherson et al. |
| 5,768,613 A | 6/1998 | Asghar |
| 5,771,186 A | 6/1998 | Kodali et al. |
| 5,777,912 A | 7/1998 | Leung et al. |
| 5,784,636 A | 7/1998 | Rupp |
| 5,790,446 A | 8/1998 | Yu et al. |
| 5,794,067 A | 8/1998 | Kadowaki |
| 5,801,546 A | 9/1998 | Pierce et al. |
| 5,805,477 A | 9/1998 | Perner |
| 5,805,913 A | 9/1998 | Guttag et al. |
| 5,808,926 A | 9/1998 | Gorshtein et al. |
| 5,812,479 A | 9/1998 | Cliff et al. |
| 5,812,562 A | 9/1998 | Baeg |
| 5,815,422 A | 9/1998 | Dockser |
| 5,821,776 A | 10/1998 | McGowan |
| 5,825,202 A | 10/1998 | Tavana et al. |
| 5,838,165 A | 11/1998 | Chatter |
| 5,841,684 A | 11/1998 | Dockser |
| 5,847,579 A | 12/1998 | Trimberger |
| 5,847,978 A | 12/1998 | Ogura et al. |
| 5,847,981 A | 12/1998 | Kelley et al. |
| 5,859,878 A | 1/1999 | Phillips et al. |
| 5,869,979 A | 2/1999 | Bocchino |
| 5,872,380 A | 2/1999 | Rostoker et al. |
| 5,874,834 A | 2/1999 | New |
| 5,878,250 A | 3/1999 | LeBlanc |
| 5,880,981 A | 3/1999 | Kojima et al. |
| 5,892,962 A | 4/1999 | Cloutier |
| 5,894,228 A | 4/1999 | Reddy et al. |
| 5,898,602 A | 4/1999 | Rothman et al. |
| 5,931,898 A | 8/1999 | Khoury |
| 5,942,914 A | 8/1999 | Reddy et al. |
| 5,944,774 A | 8/1999 | Dent |
| 5,949,710 A | 9/1999 | Pass et al. |
| 5,951,673 A | 9/1999 | Miyata |
| 5,956,265 A | 9/1999 | Lewis |
| 5,959,871 A | 9/1999 | Pierzchala et al. |
| 5,960,193 A | 9/1999 | Guttag et al. |
| 5,961,635 A | 10/1999 | Guttag et al. |
| 5,963,048 A | 10/1999 | Harrison et al. |
| 5,963,050 A | 10/1999 | Young et al. |
| 5,968,196 A | 10/1999 | Ramamurthy et al. |
| 5,970,254 A | 10/1999 | Cooke et al. |
| 5,978,260 A | 11/1999 | Trimberger et al. |
| 5,982,195 A | 11/1999 | Cliff et al. |
| 5,986,465 A | 11/1999 | Mendel |
| 5,991,788 A | 11/1999 | Mintzer |
| 5,991,898 A | 11/1999 | Rajski et al. |
| 5,995,748 A | 11/1999 | Guttag et al. |
| 5,999,015 A | 12/1999 | Cliff et al. |
| 5,999,990 A | 12/1999 | Sharrit et al. |
| 6,005,806 A | 12/1999 | Madurawe et al. |
| 6,006,321 A | 12/1999 | Abbott |
| 6,009,451 A | 12/1999 | Burns |
| 6,018,755 A | 1/2000 | Gonikberg et al. |
| 6,020,759 A | 2/2000 | Heile |
| 6,021,423 A | 2/2000 | Nag et al. |
| 6,029,187 A | 2/2000 | Verbauwhede |
| 6,031,763 A | 2/2000 | Sansbury |
| 6,041,339 A | 3/2000 | Yu et al. |
| 6,041,340 A | 3/2000 | Mintzer |
| 6,052,327 A | 4/2000 | Reddy et al. |
| 6,052,755 A | 4/2000 | Terrill et al. |
| 6,055,555 A | 4/2000 | Boswell et al. |
| 6,064,614 A | 5/2000 | Khoury |
| 6,065,131 A | 5/2000 | Andrews et al. |
| 6,066,960 A | 5/2000 | Pedersen |
| 6,069,487 A | 5/2000 | Lane et al. |
| 6,072,994 A | 6/2000 | Phillips et al. |
| 6,073,154 A | 6/2000 | Dick |
| 6,075,381 A | 6/2000 | LaBerge |
| 6,084,429 A | 7/2000 | Trimberger |
| 6,085,317 A | 7/2000 | Smith |
| 6,091,261 A | 7/2000 | DeLange |
| 6,091,765 A | 7/2000 | Pietzold, III et al. |
| 6,094,726 A | 7/2000 | Gonion et al. |
| 6,097,988 A | 8/2000 | Tobias |

(56) References Cited

U.S. PATENT DOCUMENTS

| | | |
|---|---|---|
| 6,098,163 A | 8/2000 | Guttag et al. |
| 6,107,820 A | 8/2000 | Jefferson et al. |
| 6,107,821 A | 8/2000 | Kelem et al. |
| 6,107,824 A | 8/2000 | Reddy et al. |
| 6,130,554 A | 10/2000 | Kolze et al. |
| 6,140,839 A | 10/2000 | Kaviani et al. |
| 6,144,980 A | 11/2000 | Oberman |
| 6,154,049 A | 11/2000 | New |
| 6,157,210 A | 12/2000 | Zaveri et al. |
| 6,163,788 A | 12/2000 | Chen et al. |
| 6,167,415 A | 12/2000 | Fischer et al. |
| 6,175,849 B1 | 1/2001 | Smith |
| 6,215,326 B1 | 4/2001 | Jefferson et al. |
| 6,226,735 B1 | 5/2001 | Mirsky |
| 6,242,947 B1 | 6/2001 | Trimberger |
| 6,243,729 B1 | 6/2001 | Staszewski |
| 6,246,258 B1 | 6/2001 | Lesea |
| 6,260,053 B1 | 7/2001 | Maulik et al. |
| 6,279,021 B1 | 8/2001 | Takano et al. |
| 6,286,024 B1 | 9/2001 | Yano et al. |
| 6,314,442 B1 | 11/2001 | Suzuki |
| 6,314,551 B1 | 11/2001 | Borland |
| 6,321,246 B1 | 11/2001 | Page et al. |
| 6,323,680 B1 | 11/2001 | Pedersen et al. |
| 6,327,605 B2 | 12/2001 | Arakawa et al. |
| 6,351,142 B1 | 2/2002 | Abbott |
| 6,353,843 B1 | 3/2002 | Chehrazi et al. |
| 6,359,468 B1 | 3/2002 | Park et al. |
| 6,360,240 B1 | 3/2002 | Takano et al. |
| 6,362,650 B1 | 3/2002 | New et al. |
| 6,366,944 B1 | 4/2002 | Hossain et al. |
| 6,367,003 B1 | 4/2002 | Davis |
| 6,369,610 B1 | 4/2002 | Cheung et al. |
| 6,377,970 B1 | 4/2002 | Abdallah et al. |
| 6,407,576 B1 | 6/2002 | Ngai et al. |
| 6,407,694 B1 | 6/2002 | Cox et al. |
| 6,427,157 B1 | 7/2002 | Webb |
| 6,434,587 B1 | 8/2002 | Liao et al. |
| 6,438,569 B1 | 8/2002 | Abbott |
| 6,438,570 B1 | 8/2002 | Miller |
| 6,446,107 B1 | 9/2002 | Knowles |
| 6,453,382 B1 | 9/2002 | Heile |
| 6,467,017 B1 | 10/2002 | Ngai et al. |
| 6,480,980 B2 | 11/2002 | Koe |
| 6,483,343 B1 | 11/2002 | Faith et al. |
| 6,487,575 B1 | 11/2002 | Oberman |
| 6,523,055 B1 | 2/2003 | Yu et al. |
| 6,523,057 B1 | 2/2003 | Savo et al. |
| 6,531,888 B2 | 3/2003 | Abbott |
| 6,538,470 B1 | 3/2003 | Langhammer et al. |
| 6,542,000 B1 | 4/2003 | Black et al. |
| 6,556,044 B2 | 4/2003 | Langhammer et al. |
| 6,557,092 B1 | 4/2003 | Callen |
| 6,571,268 B1 | 5/2003 | Giacalone et al. |
| 6,573,749 B2 | 6/2003 | New et al. |
| 6,574,762 B1 | 6/2003 | Karimi et al. |
| 6,591,283 B1 | 7/2003 | Conway et al. |
| 6,591,357 B2 | 7/2003 | Mirsky |
| 6,600,495 B1 | 7/2003 | Boland et al. |
| 6,600,788 B1 | 7/2003 | Dick et al. |
| 6,628,140 B2 | 9/2003 | Langhammer et al. |
| 6,687,722 B1 | 2/2004 | Larsson et al. |
| 6,692,534 B1 | 2/2004 | Wang et al. |
| 6,700,581 B2 | 3/2004 | Baldwin et al. |
| 6,725,441 B1 | 4/2004 | Keller et al. |
| 6,728,901 B1 | 4/2004 | Rajski et al. |
| 6,731,133 B1 | 5/2004 | Feng et al. |
| 6,732,134 B1 | 5/2004 | Rosenberg et al. |
| 6,744,278 B1 | 6/2004 | Liu et al. |
| 6,745,254 B2 | 6/2004 | Boggs et al. |
| 6,763,367 B2 | 7/2004 | Kwon et al. |
| 6,771,094 B1 | 8/2004 | Langhammer et al. |
| 6,774,669 B1 | 8/2004 | Liu et al. |
| 6,781,408 B1 | 8/2004 | Langhammer |
| 6,781,410 B2 | 8/2004 | Pani et al. |
| 6,788,104 B2 | 9/2004 | Singh et al. |
| 6,801,924 B1 | 10/2004 | Green et al. |
| 6,836,839 B2 | 12/2004 | Master et al. |
| 6,874,079 B2 | 3/2005 | Hogenauer |
| 6,889,238 B2 | 5/2005 | Johnson |
| 6,904,471 B2 | 6/2005 | Boggs et al. |
| 6,924,663 B2 | 8/2005 | Masui et al. |
| 6,963,890 B2 | 11/2005 | Dutta et al. |
| 6,971,083 B1 | 11/2005 | Farrugia et al. |
| 6,978,287 B1 | 12/2005 | Langhammer |
| 6,983,300 B2 | 1/2006 | Ferroussat |
| 7,020,673 B2 | 3/2006 | Ozawa |
| 7,047,272 B2 | 5/2006 | Giacalone et al. |
| 7,062,526 B1 | 6/2006 | Hoyle |
| 7,093,204 B2 | 8/2006 | Oktem et al. |
| 7,107,305 B2 | 9/2006 | Deng et al. |
| 7,113,969 B1 | 9/2006 | Green et al. |
| 7,181,484 B2 | 2/2007 | Stribaek et al. |
| 7,200,631 B2 | 4/2007 | Mailaender et al. |
| 7,313,585 B2 | 12/2007 | Winterrowd |
| 7,395,298 B2 | 7/2008 | Debes et al. |
| 7,401,109 B2 | 7/2008 | Koc et al. |
| 7,409,417 B2 | 8/2008 | Lou |
| 7,415,542 B2 | 8/2008 | Hennedy et al. |
| 7,421,465 B1 | 9/2008 | Rarick et al. |
| 7,428,565 B2 | 9/2008 | Fujimori |
| 7,428,566 B2 | 9/2008 | Siu et al. |
| 7,430,578 B2 | 9/2008 | Debes et al. |
| 7,430,656 B2 | 9/2008 | Sperber et al. |
| 7,447,310 B2 | 11/2008 | Koc et al. |
| 7,472,155 B2 | 12/2008 | Simkins et al. |
| 7,508,936 B2 | 3/2009 | Eberle et al. |
| 7,536,430 B2 | 5/2009 | Guevokian et al. |
| 7,567,997 B2 | 7/2009 | Simkins et al. |
| 7,590,676 B1 | 9/2009 | Langhammer |
| 7,646,430 B2 | 1/2010 | Brown Elliott et al. |
| 7,668,896 B2 | 2/2010 | Lutz et al. |
| 7,719,446 B2 | 5/2010 | Rosenthal et al. |
| 7,769,797 B2 | 8/2010 | Cho et al. |
| 7,814,137 B1 | 10/2010 | Mauer |
| 7,822,799 B1 | 10/2010 | Langhammer et al. |
| 7,836,117 B1 | 11/2010 | Langhammer et al. |
| 7,865,541 B1 | 1/2011 | Langhammer |
| 7,930,335 B2 | 4/2011 | Gura |
| 7,930,336 B2 | 4/2011 | Langhammer |
| 7,949,699 B1 | 5/2011 | Neoh et al. |
| 7,974,997 B2 | 7/2011 | Arviv et al. |
| 8,041,759 B1 | 10/2011 | Langhammer et al. |
| 8,196,012 B2 | 6/2012 | Lau et al. |
| 8,539,016 B1 * | 9/2013 | Langhammer ................ 708/520 |
| 2001/0023425 A1 | 9/2001 | Oberman et al. |
| 2001/0029515 A1 | 10/2001 | Mirsky |
| 2001/0037352 A1 | 11/2001 | Hong |
| 2002/0002573 A1 | 1/2002 | Landers et al. |
| 2002/0038324 A1 | 3/2002 | Page et al. |
| 2002/0049798 A1 | 4/2002 | Wang et al. |
| 2002/0078114 A1 | 6/2002 | Wang et al. |
| 2002/0089348 A1 | 7/2002 | Langhammer |
| 2002/0116434 A1 | 8/2002 | Nancekievill |
| 2003/0088757 A1 | 5/2003 | Lindner et al. |
| 2004/0064770 A1 | 4/2004 | Xin |
| 2004/0083412 A1 | 4/2004 | Corbin et al. |
| 2004/0103133 A1 | 5/2004 | Gurney |
| 2004/0122882 A1 | 6/2004 | Zakharov et al. |
| 2004/0148321 A1 | 7/2004 | Guevorkian et al. |
| 2004/0172439 A1 | 9/2004 | Lin |
| 2004/0178818 A1 | 9/2004 | Crotty et al. |
| 2004/0193981 A1 | 9/2004 | Clark et al. |
| 2004/0267857 A1 | 12/2004 | Abel et al. |
| 2004/0267863 A1 | 12/2004 | Bhushan et al. |
| 2005/0038842 A1 | 2/2005 | Stoye |
| 2005/0144212 A1 | 6/2005 | Simkins et al. |
| 2005/0144215 A1 | 6/2005 | Simkins et al. |
| 2005/0144216 A1 | 6/2005 | Simkins et al. |
| 2005/0166038 A1 | 7/2005 | Wang et al. |
| 2005/0187997 A1 | 8/2005 | Zheng et al. |
| 2005/0187999 A1 | 8/2005 | Zheng et al. |
| 2005/0262175 A1 | 11/2005 | Iino et al. |
| 2006/0020655 A1 | 1/2006 | Lin |

(56) References Cited

U.S. PATENT DOCUMENTS

| | | | |
|---|---|---|---|
| 2007/0083585 | A1 | 4/2007 | St. Denis et al. |
| 2007/0185951 | A1 | 8/2007 | Lee et al. |
| 2007/0185952 | A1 | 8/2007 | Langhammer et al. |
| 2007/0226287 | A1 | 9/2007 | Lin et al. |
| 2007/0241773 | A1 | 10/2007 | Hutchings et al. |
| 2008/0133627 | A1 | 6/2008 | Langhammer et al. |
| 2008/0183783 | A1 | 7/2008 | Tubbs |
| 2009/0028455 | A1 | 1/2009 | Nakamura et al. |
| 2009/0172052 | A1 | 7/2009 | DeLaquil et al. |
| 2009/0187615 | A1 | 7/2009 | Abe et al. |
| 2009/0300088 | A1 | 12/2009 | Michaels et al. |
| 2010/0098189 | A1 | 4/2010 | Oketani |
| 2011/0219052 | A1 | 9/2011 | Langhammer |
| 2011/0238720 | A1 | 9/2011 | Langhammer |
| 2012/0113133 | A1 | 5/2012 | Shpigelblat |
| 2012/0191967 | A1 | 7/2012 | Lin et al. |

FOREIGN PATENT DOCUMENTS

| | | |
|---|---|---|
| EP | 0 411 491 | 2/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 721 159 | 7/1996 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 63-216131 | 8/1988 |
| JP | 4-332036 | 11/1992 |
| JP | 5-134851 | 6/1993 |
| JP | 06-187129 | 7/1994 |
| JP | 7-135447 | 5/1995 |
| JP | 11-296345 | 10/1999 |
| JP | 2000-259394 | 9/2000 |
| JP | 2002-108606 | 4/2002 |
| JP | 2002-251281 | 9/2002 |
| WO | WO95-27243 | 10/1995 |
| WO | WO96-28774 | 9/1996 |
| WO | WO97-08606 | 3/1997 |
| WO | WO98-12629 | 3/1998 |
| WO | WO98-32071 | 7/1998 |
| WO | WO98-38741 | 9/1998 |
| WO | WO99-22292 | 5/1999 |
| WO | WO99-31574 | 6/1999 |
| WO | WO99-56394 | 11/1999 |
| WO | WO00-51239 | 8/2000 |
| WO | WO00-52824 | 9/2000 |
| WO | WO01-13562 | 2/2001 |
| WO | WO 2005/066832 | 7/2005 |
| WO | WO2005-101190 | 10/2005 |

OTHER PUBLICATIONS

Altera Corporation, "Advanced Synthesis Cookbook: A Design Guide for Stratix II, Stratix III and Stratix IV Devices," Document Version 3.0, 112 pgs., May 2008.

deDinechin, F. et al., "Large multipliers with less DSP blocks," retrieved from http://hal-ens-lyon.archives-ouvertes.fr/ensl-00356421/en/, 9 pgs., available online Jan. 2009.

Wajih, E.-H.Y. et al., "Efficient Hardware Architecture of Recursive Karatsuba-Ofman Multiplier," $3^{rd}$ International Conference on Design and Technology of Integrated Systems in Nanoscale Era, 6 pgs, Mar. 2008.

Zhou, G. et al., "Efficient and High-Throughput Implementations of AES-GCM on FPGAs," International Conference on Field-Programmable Technology, 8 pgs., Dec. 2007.

Altera Corporation, "Statix II Device Handbook, Chapter 6—DSP Blocks in Stratix II Devices," v1.1, Jul. 2004.

Altera Corporation, "Digital Signal Processing (DSP)," Stratix Device Handbook, vol. 2, Chapter 6 and Chapter 7, v1.1 (Sep. 2004).

Altera Corporation, "DSP Blocks in Stratix II and Stratix II GX Devices," Stratix II Device Handbook, vol. 2, Chapter 6, v4.0 (Oct. 2005).

Altera Corporation, "FIR Compiler: MegaCore® Function User Guide," version 3.3.0, rev. 1, pp. 3 11 through 3 15 (Oct. 2005).

Amos, D., "PLD architectures match DSP algorithms," Electronic Product Design, vol. 17, No. 7, Jul. 1996, pp. 30, 32.

Analog Devices, Inc., The Applications Engineering Staff of Analog Devices, DSP Division, Digital Signal Processing Applications Using the ADSP-2100 Family (edited by Amy Mar), 1990, pp. 141-192).

Andrejas, J., et al., "Reusable DSP functions in FPGAs," Field-Programmable Logic and Applications. Roadmap to Reconfigurable Computing. 10th International Conference, FPL 2000. Proceedings (Lecture Notes in Computer Science vol. 1896), Aug. 27-30, 2000, pp. 456-461.

Aoki, T., "Signed-weight arithmetic and its application to a field-programmable digital filter architecture," IEICE Transactions on Electronics, 1999, vol. E82C, No. 9, Sep. 1999, pp. 1687-1698.

Ashour, M.A., et al., "An FPGA implementation guide for some different types of serial-parallel multiplier-structures," Microelectronics Journal, vol. 31, No. 3, 2000, pp. 161-168.

Berg, B.L., et al."Designing Power and Area Efficient Multistage FIR Decimators with Economical Low Order Filters," ChipCenter Technical Note, Dec. 2001.

Bursky, D., "Programmable Logic Challenges Traditional ASIC SoC Designs", Electronic Design, Apr. 15, 2002.

Chhabra, A. et al., Texas Instruments Inc., "A Block Floating Point Implementation on the TMS320C54x DSP", Application Report SPRA610, Dec. 1999, pp. 1-10.

Colet, P., "When DSPs and FPGAs meet: Optimizing image processing architectures," Advanced Imaging, vol. 12, No. 9, Sep. 1997, pp. 14, 16, 18.

Crookes, D., et al., "Design and implementation of a high level programming environment for FPGA-based image processing," IEE Proceedings-Vision, Image and Signal Processing, vol. 147, No. 4, Aug. 2000, pp. 377-384.

Debowski, L., et al., "A new flexible architecture of digital control systems based on DSP and complex CPLD technology for power conversion applications," PCIM 2000: Europe Official Proceedings of the Thirty-Seventh International Intelligent Motion Conference, Jun. 6-8, 2000, pp. 281-286.

Dick, C., et al., "Configurable logic for digital communications: some signal processing perspectives," IEEE Communications Magazine, vol. 37, No. 8, Aug. 1999, pp. 107-111.

Do, T.-T., et al., "A flexible implementation of high-performance FIR filters on Xilinx FPGAs," Field-Programmable Logic and Applications: From FPGAs to Computing Paradigm. 8th International Workshop, FPL'98. Proceedings, Hartenstein, R.W., et al., eds., Aug. 31-Sep. 3, 1998, pp. 441-445.

Gaffer, A.A., et al., "Floating-Point Bitwidth Analysis via Automatic Differentiation," IEEE Conference on Field Programmable Technology, Hong Kong, Dec. 2002.

Guccione, S.A.,"Run-time Reconfiguration at Xilinx," Parallel and distributed processing: 15 IPDPS 2000 workshops, Rolim, J., ed., May 1-5, 2000, p. 873.

Hauck, S., "The Future of Reconfigurable Systems," Keynote Address, 5th Canadian Conference on Field Programmable Devices, Jun. 1998, http:--www.ee.washington.edu-people-faculty-hauck-publications-ReconfigFuture.PDF.

Haynes, S.D., et al., "Configurable multiplier blocks for embedding in FPGAs," Electronicas Letters, vol. 34, No. 7, pp. 638-639 (Apr. 2, 1998).

Heysters, P.M., et al., "Mapping of DSP algorithms on field programmable function arrays," Field-Programmable Logic and Applications. Roadmap to Reconfigurable Computing. 10th International

(56) References Cited

OTHER PUBLICATIONS

Conference, *FPL 2000 Proceedings (Lecture Notes in Computer Science* vol. 1896), Aug. 27-30, 2000, pp. 400-411.

Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.

Lattice Semiconductor Corp, *Orca® FPGA Express™ Interface Manual: ispLEVER®Version 3.0*, 2002.

Lucent Technologies, Microelectronics Group,"Implementing and Optimizing Multipliers in ORCA™ FPGAs,", Application Note. AP97-008FGPA, Feb. 1997.

"Implementing Multipliers in FLEX 10K EABs", *Altera*, Mar. 1996.

"Implementing Logic with the Embedded Array in FLEX 10K Devices", *Altera*, May 2001, ver. 2.1.

Jinghua Li, "Design a pocket multi-bit multiplier in FPGA," *1996 2nd International Conference on ASIC Proceedings (IEEE Cat. No. 96TH8140)* Oct. 21-24, 1996, pp. 275-279.

Jones, G., "Field-programmable digital signal conditioning," *Electronic Product Design*, vol. 21, No. 6, Jun. 2000, pp. C36-C38.

Kiefer, R., et al., "Performance comparison of software-FPGA hardware partitions for a DSP application," *14th Australian Microelectronics Conference. Microelectronics: Technology Today for the Future. MICRO '97 Proceedings*, Sep. 28-Oct. 1, 1997, pp. 88-93.

Kramberger, I., "DSP acceleration using a reconfigurable FPGA," *ISIE '99 Proceedings of the IEEE International Symposium on Industrial Electronics (Cat. No. 99TH8465)* vol. 3 , Jul. 12-16, 1999, pp. 1522-1525.

Langhammer, M., "How to implement DSP in programmable logic," *Elettronica Oggi*, No. 266 , Dec. 1998, pp. 113-115.

Langhammer, M., "Implementing a DSP in Programmable Logic," *Online EE Times*, May 1998, http:--www.eetimes.com-editorial-1998-coverstory9805.html.

Lazaravich, B.V., "Function block oriented field programmable logic arrays," *Motorola, Inc. Technical Developments*, vol. 18, Mar. 1993, pp. 10-11.

Lund, D., et al., "A new development system for reconfigurable digital signal processing," First International Conference on 3G Mobile Communication Technologies (Conf. Publ. No. 471), Mar. 27-29, 2000, pp. 306-310.

Miller, N.L., et al., "Reconfigurable integrated circuit for high performance computer arithmetic," *Proceedings of the 1998 IEE Colloguium on Evolvable Hardware Systems (Digest)*, No. 233, 1998, pp. 2-1-2-4.

Mintzer, L., "Xilinx FPGA as an FFT processor," *Electronic Engineering*, vol. 69, No. 845, May 1997, pp. 81, 82, 84.

Faura et al., "A Novel Mixed Signal Programmable Device With On-Chip Microprocessor," Custom Integrated Circuits Conference, 1997. Proceedings of the IEEE 1997 Santa Clara, CS, USA, May 5, 1997, pp. 103-106.

Nozal, L., et al., "A new vision system: programmable logic devices and digital signal processor architecture (PLD+DSP)," *Proceedings IECON '91. 1991 International Conference on Industrial Electronics, Control and Instrumentation (Cat. No. 91CH2976-9)*, vol. 3, Oct. 28-Nov. 1, 1991, pp. 2014-2018.

Papenfuss, J.R, et al., "Implementation of a real-time, frequency selective, RF channel simulator using a hybrid DSP-FPGA architecture," *RAWCON 2000: 2000 IEEE Radio and Wireless Conference (Cat. No. 00EX404)* Sep. 10-13, 2000, pp. 135-138.

Parhami, B., "Configurable arithmetic arrays with data-driven control," *34th Asilomar Conference on Signals, Systems and Computers*, vol. 1, 2000, pp. 89-93.

"The QuickDSP Design Guide", Quicklogic, Aug. 2001, revision B.

"QuickDSP™ Family Data Sheet", *Quicklogic*, Aug. 7, 2001, revision B.

Rangasayee, K., "Complex PLDs let you produce efficient arithmetic designs," *EDN (European Edition)* vol. 41, No. 13, Jun. 20, 1996, pp. 109, 110, 112, 114,.

Rosado, A., et al., "A high-speed multiplier coprocessor unit based on FPGA," *Journal of Electrical Engineering*, vol. 48, No. 11-12, 1997, pp. 298-302.

Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications (Cat. No. 99EX303)* Jul. 26-28,1999, pp. 147-150.

Texas Instruments Inc., "TMS320C54x DSP Reference Set, vol. 1: CPU and Peripherals", Apr. 1999, pp. 2-1 through 2-16 and 4-1 through 4-29.

Tisserand, A., et al., "An on-line arithmetic based FPGA for low power custom computing," *Field Programmable Logic and Applications, 9th International Workshop, FPL'99, Proceedings (Lecture Notes in Computer Science* vol. 1673), Lysaght, P., et al., eds., Aug. 30-Sep. 1, 1999, pp. 264-273.

Tralka, C., "Symbiosis of DSP and PLD," *Elektronik*, vol. 49, No. 14 , Jul. 11, 2000, pp. 84-96.

Underwood, K. "FPGAs vs. CPUs: Trends in Peak Floating-Point Performance," *Proceedings of the 2004 ACM-SIGDA 12th International Symposium on Field Programmable Gate Arrays*, pp. 171-180, Feb. 22-24, 2004.

Valls, J., et al., "A Study About FPGA-Based Digital Filters," *Signal Processing Systems*, 1998, SIPS 98, 1998 IEEE Workshop, Oct. 10, 1998, pp. 192-201.

"Virtex-II 1.5V Field-Programmable Gate Arrays", *Xilinx*, Jan. 25, 2001, module 2 of 4.

"Virtex-II 1.5V Field-Programmable Gate Arrays", *Xilinx*, Apr. 2, 2001, module 1 of 4.

"Virtex-II 1.5V Field-Programmable Gate Arrays", *Xilinx*, Apr. 2, 2001, module 2 of 4.

Walters, A.L., "A Scaleable FIR Filter Implementation Using 32-bit Floating-Point Complex Arithmetic on ,a FPGA Based Custom Computing Platform," Allison L. Walters, Thesis Submitted to the Faculty of Virginia Polytechnic Institute and State University, Jan. 30, 1998.

Weisstein, E.W., "Karatsuba Multiplication " *MathWorld—A Wolfram Web Resource* (Dec. 9, 2007), accessed Dec. 11, 2007 at http:--mathworld.wolfram.com-KaratsubaMultiplication.html.

Wenzel, L., "Field programmable gate arrays (FPGAs) to replace digital signal processor integrated circuits," *Elektronik*, vol. 49, No. 5, Mar. 7, 2000, pp. 78-86.

"Xilinx Unveils New FPGA Architecture to Enable High-Performance, 10 Million System Gate Designs", *Xilinx*, Jun. 22, 2000.

"Xilinx Announces DSP Algorithms, Tools and Features for Virtex-II Architecture", *Xilinx*, Nov. 21, 2000.

Xilinx Inc., "Virtex-II 1.5V Field-Programmable Gate Arrays", Advance Product Specification, DS031-2 (v1.9), Nov. 29, 2001, Module 2 of 4, pp. 1-39.

Xilinx Inc., "Using Embedded Multipliers", Virtex-II Platform FPGA Handbook, UG002 (v1.3), Dec. 3, 2001, pp. 251-257.

Xilinx, Inc., "A 1D Systolic FIR," copyright 1994-2002, downloaded from http:--www.iro.umontreal.ca-~aboulham-F6221-Xilinx%20A%201D%20systolic%20FIR.htm.

Xilinx, Inc., "The Future of FPGA's," White Paper, available Nov. 14, 2005 for download from http:--www.xilinx.com-prs_rls,5yrwhite.htm.

Xilinx Inc., "XtremeDSP Design Considerations User Guide," v 1.2, Feb. 4, 2005.

Xilinx Inc., "Complex Multiplier v2.0", DS291 Product Specification/Datasheet, Nov. 2004.

Kim, Y., et al., "Fast GPU Implementation for the Solution of Tridiagonal Matrix Systems," *Journal of Korean Institute of Information Scientists and Engineers*, vol. 32, No. 12, pp. 692-704, Dec. 2005.

Govindu, G. et al., "A Library of Parameterizable Floating-Point Cores for FPGAs and Their Application to Scientific Computing," *Proc Int'l Conf. Eng. Reconfigurable Systems and Algorithms (ERSA '05)*, Jun. 2005.

(56) References Cited

OTHER PUBLICATIONS

Govindu, G. et al., "Analysis of High-performance Floating-point Arithmetic on FPGAs," *Proceedings of the 18th International Parallel and Distributed Processing Symposium (PDPS'04)* pp. 149-156, Apr. 2004.

Nakasato, N., et al., "Acceleration of Hydrosynamical Simulations using a FPGA board", *The Institute of Electronics Information and Communication Technical Report CPSY2005-47*, vol. 105, No. 515, Jan. 17, 2006.

Osana, Y., et al., "Hardware-resource Utilization Analysis on an FPGA-Based Biochemical Simulator ReCSiP", *The Institute of Electronics Information and Communication Technical Report CPSY2005-63*, vol. 105, No. 516, Jan. 18, 2006.

Vladimirova, T. et al., "Floating-Point Mathematical Co-Processor for a Single-Chip On-Board Computer," *MAPLD'03 Conference, D5*, Sep. 2003.

\* cited by examiner

QR DECOMPOSITION IN AN INTEGRATED CIRCUIT DEVICE

FIELD OF THE INVENTION

This invention relates to performing QR decomposition operations in integrated circuit devices.

BACKGROUND OF THE INVENTION

QR decomposition (also called a QR factorization) of a matrix is a decomposition of the matrix into an orthogonal matrix Q and a right triangular matrix R. QR decomposition may be used, for example, to solve the linear least squares problem. QR decomposition also is the basis for a particular eigenvalue algorithm called the QR algorithm One known technique for performing QR decomposition is the modified Gram-Schmidt technique, which calculates the Q matrix as follows (where A is the input matrix, having columns ak and elements ajk):

for k=0:n−1
  r(k,k)=norm(A(1:m, k));
  for j=k+1:n−1
    r(k, j)=dot(A(1:m, k), A(1:m, j))/r(k,k);
  end
  q(1:m, k)=A(1:m, k)/r(k,k);
  for j=k+1:n−1
    A(1:m, j)=A(1:m, j)−r(k, j)·q(1:m, k);
  end
end As can be seen, there are two data dependencies. First, neither the r(k, j) nor the q(1:m, k) terms can be computed until r(k,k) has been computed. And while r(k,k) is nominally computed first, floating point functions may have long latencies. Second, the A(1:m, j) terms cannot be computed until the r(k, j) and q(1:m, k) terms have been computed. These dependencies may introduce stalls in the data flow.

Such data dependencies can cause delays when the computation is performed in hardware, and also may be of concern in a software implementation in a multicore processor environment, or even in a single core processor environment if the processor is deeply pipelined and the pipeline is optimized for more functions more common than division.

Copending, commonly-assigned U.S. patent application Ser. No. 12/703,146, filed Feb. 9, 2010, describes a modified Gram-Schmidt orthogonalization with no dependencies between iterations, but one internal dependency remains.

SUMMARY OF THE INVENTION

The present invention relates to circuitry for speeding up the QR decomposition of a matrix. The circuitry can be provided in a fixed logic device, or can be configured into a programmable integrated circuit device such as a programmable logic device (PLD).

In accordance with embodiments of the invention, there is provided circuitry for performing QR decomposition of an input matrix. The circuitry includes multiplication/addition circuitry for performing multiplication and addition/subtraction operations on a plurality of inputs, division/square-root circuitry for performing division and square-root operations on an output of the multiplication/addition circuitry, a first memory for storing the input matrix, a second memory for storing a selected vector of the input matrix, and a selector for inputting to the multiplication/addition circuitry any one or more of a vector of the input matrix, the selected vector, and an output of the division/square-root circuitry.

A method of performing QR decomposition of an input matrix using such circuitry is provided. The method includes on respective successive passes, reading a respective vector of the input matrix from a first memory into a second memory, and computing elements of a respective vector of an R matrix of the QR decomposition and replacing the respective vector of the input matrix in the first memory with the respective vector of the R matrix. After all vectors of the input matrix have been processed, the first memory contains an output matrix of the QR decomposition.

A machine-readable data storage medium encoded with software for performing a method of configuring such circuitry on a programmable device are also provided.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE INVENTION

Circuitry according to the invention implements the following modified Gram-Schmidt algorithm, where lines of the algorithm set forth above are reproduced and their substitutes, if any, are shown in italics, and the norm function is replaced with square-root and dot-product functions which are more readily available in hardware implementations:

for k=0:n−1
  r(k,k)=sqrt(dot(A(1:m, k), A(1:m,k));
    This can be rewritten as:
    $r_2$(k,k)=dot(A(1:m, k), A(1:m,k);
    r(k,k)=sqrt($r_2$(k,k));

```
for j=k+1:n−1
   r(k, j)=dot(A(1:m, k), A(1:m, j))/r(k,k);
      This can be rewritten as:
      rn(k, j)=dot(A(1:m, k), A(1:m, j));
      r(k, j)=rn(k,j)/r(k,k);
end
q(1:m, k)=A(1:m, k)/r(k,k);
for j=k+1:n−1
   A(1:m, j)=A(1:m, j)−r(k,j)−q(1:m,k);
end
end
```

The result is:
```
for k=0:n−1
r₂(k,k)=dot(A(1:m, k), A(1:m,k);
r(k,k)=sqrt(r₂(k,k));
for j=k+1:n−1
   rn(k, j)=dot(A(1:m, k), A(1:m, j));
   r(k, j)=rn(k,j)/r(k,k);
end
q(1:m, k)=A(1:m, k)/r(k,k);
for j=k+1:n<1
   A(1:m, j)=A(1:m, j)−r(k,j)·q(1:m,k);
end
end
```

In the expression for A(1:m, j), replacing q(1:m,k) with A(1:m,k)/r(k,k) and r(k,j) with rn(k,j)/r(k,k) yields:
```
for k=0:n−1
r₂(k,k)=dot(A(1:m, k), A(1:m,k);
r(k,k)=sqrt(r₂(k,k));
for j=k+1:n−1
   rn(k, j)=dot(A(1:m, k), A(1:m, j));
   r(k, j)=rn(k,j)/r(k,k);
end
q(1:m, k)=A(1:m, k)/r(k,k);
for j=k+1:n−1
A(1:m, j)=A(1:m, j)−rn(k,j)/r(k,k)·A(1:m,k)/r(k,k);
end
end
```

Reordering further yields:
```
for k=0:n−1
r₂(k,k)=dot(A(1:m, k), A(1:m,k);
for j=k+1:n−1
   rn(k, j)=dot(A(1:m, k), A(1:m, j));
end
for j=k+1:n−1
   A(1:m, j)=A(1:m, j)−(rn(k,j)/r₂(k,k))·A(1:m,k);
end
end
for k=0:n−1
r(k,k)=sqrt(r₂(k,k));
for j=k+1:n−1
   r(k,j)=rn(k,j)/r(k,k);
end
q(1:m, k)=A(1:m, k)/r(k,k);
end
```

The original algorithm required k square-root operations, $k^2/2+k$ division operations, $(k \cdot m)+mk^2/2$ addition operations, $m \cdot (k+k^2)$ complex multiplication operations, and $mk^2/2$ subtraction operations. Counting additions and subtractions together, there were k square-root operations and $k^2/2+k$ division operations, $m \cdot (k+k^2)$ addition/subtraction operations and $m \cdot (k+k^2)$ complex multiplication operations.

In the reordered algorithm, there are no square-root operations in the computations of the r2(k,k), rn(k,j) and A(1:m, j) values, with fewer overall operations in the computations of the A(1:m, j) values. Moreover, all multiplications are eliminated from the calculations of the r(k,k), r(k,j) and q(1:m, k) values. As a result, there are, in total, k square-root operations, $m \cdot (k+k^2)$ addition/subtraction operations and $m \cdot (k+k^2)$ complex multiplication operations, and $k^2+k$ division operations. Although there are more total division operations, there is still only one division operation per m complex multiplications, and the data dependencies are removed, as discussed. Moreover, removal of the square-root operations in the computations of the A values improves the precision of the results.

Figure 1:
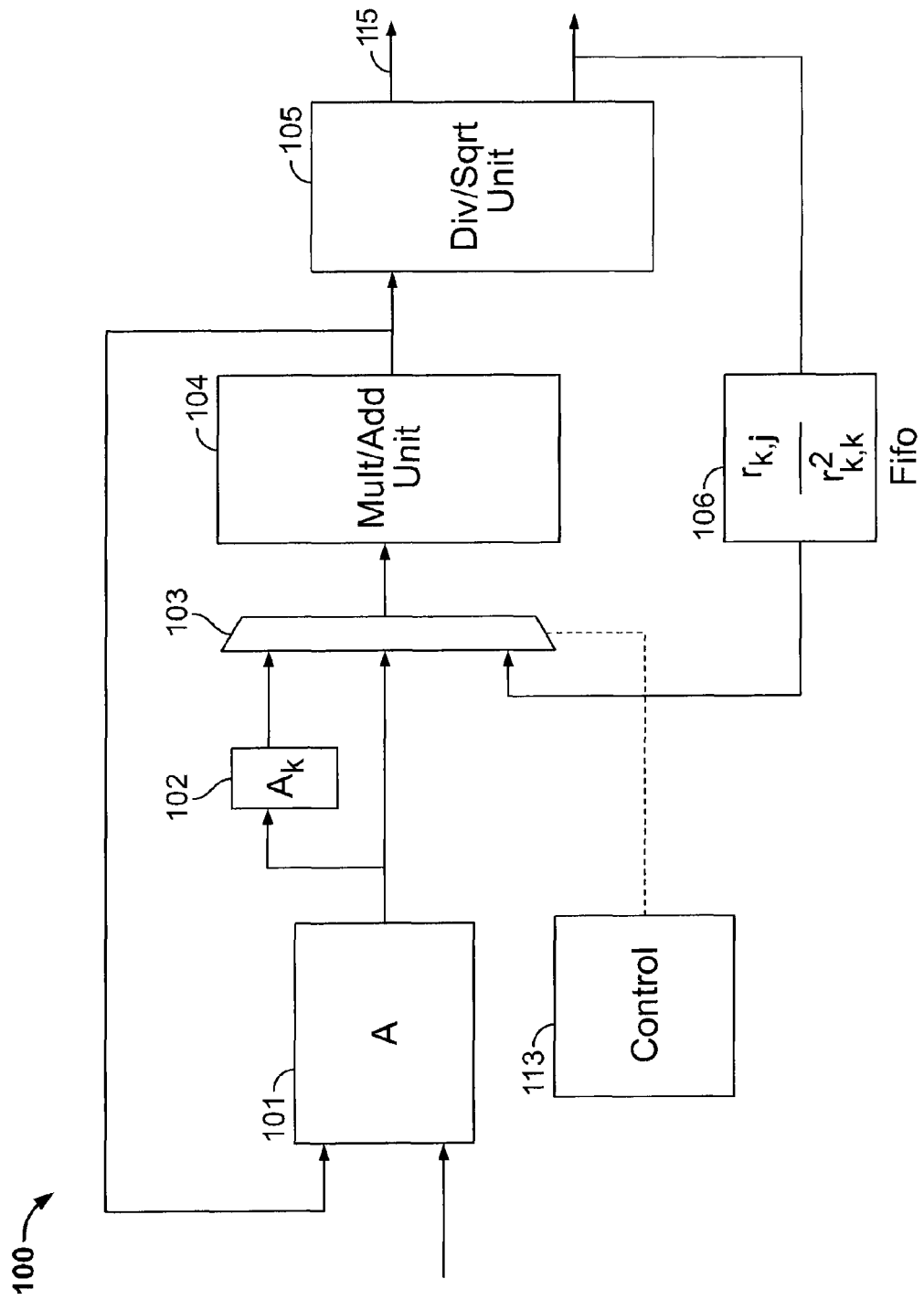
FIG. 1 shows one embodiment, according to the invention, of circuitry for QR decomposition.

A circuit implementation 100 for QR decomposition according to an embodiment of the present invention is shown in FIG. 1.

Circuit 100 includes an input matrix store 101, a column vector store 102, a multiplexer 103, a multiplication/addition unit 104, a division/square root unit 105, and a feedback FIFO 106. Multiplexer 103 is controlled by control unit 113 to provide the appropriate inputs to multiplication/addition unit 104.

If circuit 100 is implemented in a programmable logic device, multiplication/addition unit 104 could be a specialized processing block of that programmable logic device, such as a digital signal processing (DSP) block of the type provided in the STRATIX® family of field-programmable gate arrays available from Altera Corporation, of San Jose, Calif., which avoids the need to configure multipliers and adders in programmable logic of the programmable logic device.

Division/square root unit 105 could include an inverse square root unit, which is more easily implemented in hardware. The square root, SQRT(a), of a number a may then be calculated as the number a multiplied by the inverse of its square root—i.e., SQRT(a)=a·(1/SQRT(a)). Similarly, to divide two numbers, a/b, one can use the inverse square root unit to calculate 1/SQRT(b) and then multiply that result by itself to generate 1/SQRT(b)·1/SQRT(b)=1/b, which can then be multiplied by a to yield a·1/b=a/b, providing a quotient using only multipliers and the inverse square root unit. If circuit 100 is implemented in a programmable logic device, division/square root unit 105 could be a specialized processing block of that programmable logic device, or a portion of such a block of the programmable logic device.

Because of the nature of the computations, each column of the input matrix is used once and then not needed again. Therefore, if only the R matrix is needed, a separate result memory is not needed; the columns of the input matrix can be replaced by the columns of the result matrix in input matrix store 101 as they are calculated. If the Q matrix also is needed, it may be computed from the R matrix, but then an additional memory may be needed to store results. However, because of the triangular nature of the R matrix, it only occupies half as much memory as the input A matrix or the Q matrix. Therefore, the additional memory need only be half the size of input matrix store 101. In addition, column vector store 102 is provided to hold each column as it is needed, as discussed below.

Control unit 113 controls multiplexer 103 to select the inputs to multiplication/addition unit 104 according to the operation to be performed, in accordance with the following table, where, among the functions or instructions, "mag" indicates the magnitude or norm function, "dot" indicates the dot product function, "div" indicates division and "sub" indicates subtraction, and among the variables, "A" indicates the input matrix, and $A_k$ indicates the kth column of the A matrix (as stored in column vector store 102):

| Instruction | Input1 | Input2 | Input3 |
|---|---|---|---|
| mag | A | A | — |
| dot | A | Ak | — |
| div | — | Ak | 1/rk, k |
| sub | A | Ak | rk, j/r²k, k |

Multiplexer 103 can direct a single input to more than one input of multiplication/addition unit 104. Thus, in each kth outer loop, the norm ("mag") is computed first, with multiplexer 103 selecting the kth column of matrix A from input matrix store 101 and directing it to two inputs of multiplication/addition unit 104. For the dot product in the first inner loop of each iteration of the first outer loop, multiplexer 103 selects the kth column from column vector store 102, as well as the respective jth columns of matrix A from input matrix store 101 as two inputs of multiplication/addition unit 104. For the division in the inner loop of each iteration of the second outer loop, multiplexer 103 selects the kth column from column vector store 102, as well as $1/r_{k,k}$ fed back through FIFO 106 from division/square root unit 105. For the subtraction in the second inner loop of each iteration of the first outer loop, multiplexer 103 selects the respective jth columns of matrix A from input matrix store 101, the kth column from column vector store 102, and $r_{k,j}/r^2_{k,k}$ fed back through FIFO 106 from division/square root unit 105.

FIFO 106 stores the current feedback value until it is needed. Feedback values are generated in the correct order, so no reordering is necessary. When the FIFO is empty and a new value is required, the forward path will stall until a feedback value is available.

The computation of r(k,j),rn(k,j)/r(k,k) in the inner loop of the second outer loop is calculated by the division/square root unit 105, which gets its input directly from the output of multiplication/addition unit 104.

The arrangement and timing of these operations preferably is such that multiplication/addition unit 104, which consumes m complex multipliers for every divider in the division/square root unit 105 and therefore consumes the most resources, is kept busy substantially continuously.

Because the resulting R matrix is an upper triangular matrix, after each kth iteration of the outer loop, the kth column of the input matrix A is no longer needed. Accordingly, as discussed above, input matrix store 101 can be used for the output matrix R as well, avoiding the need for a separate output memory. The feedback of the output 115 to input matrix store 101 is not shown explicitly but may be provided in the larger circuit of which QR implementation circuit 100 is a part. In a programmable integrated circuit device, that feedback may be accomplished using dedicated circuitry or using the programmable interconnect resources of the device.

As further noted above, if the Q matrix is to be computed from the R matrix, additional storage will be required. However, because R is a triangular matrix, it consumes only half of input matrix store 101. Therefore, ins such case the Q matrix can be stored in input matrix store 101, and while additional memory would be needed to store the R matrix, but that additional memory could be only about half the size of input matrix store 101.

An example of a portion of a QR decomposition of a 3×3 matrix A, using embodiments of methods and circuits according to the present invention, is shown in FIGS. 2-6.

Figure 2:
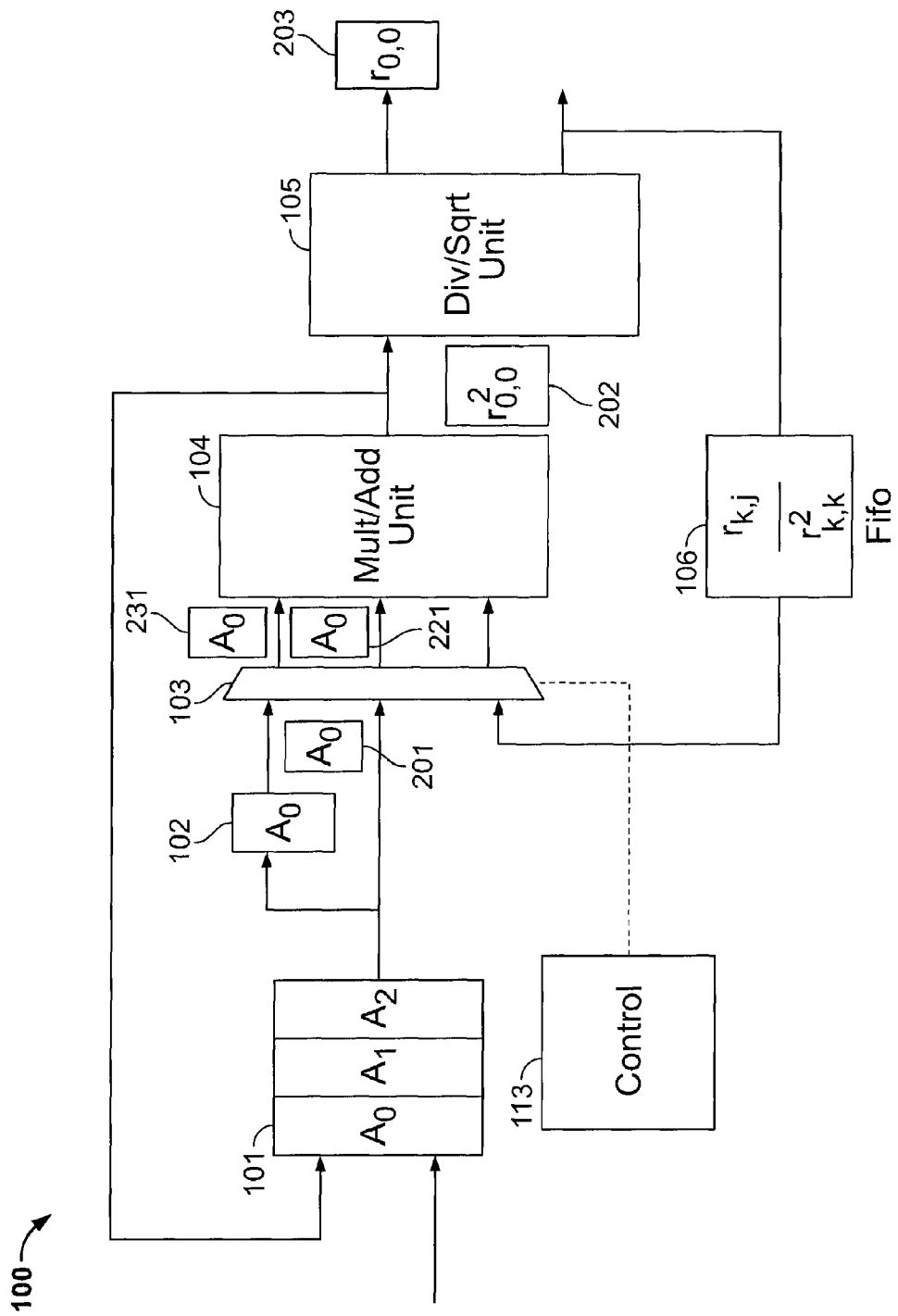
FIG. 2 shows a first iteration through the circuitry of FIG. 1.

FIG. 2 shows the use of circuit 100 to perform the first line of the first iteration of the first outer loop, which is part of the computation of the norm of matrix A. The three columns $A_0$, $A_1$ and $A_2$ of matrix A have been loaded into input matrix store 101, and the first column $A_0$ has been loaded into column vector store 102. As indicated at 201, multiplexer 103, directed by control unit 113, selects column $A_0$ from input matrix store 101 and provides it as two inputs 221, 231 to multiplication/addition unit 104. Multiplication/addition unit 104 computes $r^2_{0,0}$, at 202. Division/square root unit 105 operates on input 202 to compute $r_{0,0}$, at 203.

Figure 3:
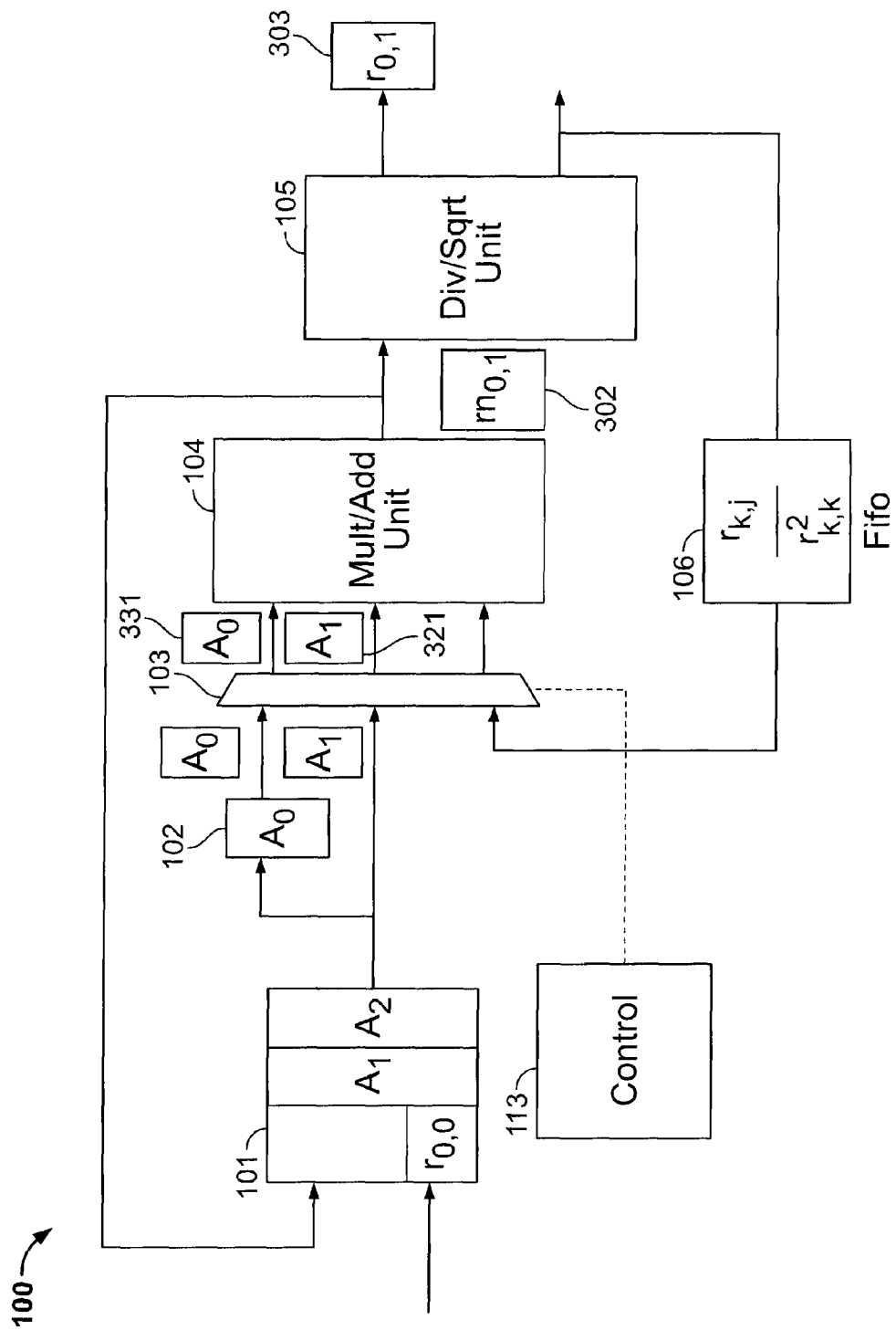
FIG. 3 shows another iteration through the circuitry of FIG. 1.

As seen in FIG. 3, $r_{0,0}$ has been routed back to input matrix store 101 and stored as an element of the column that originally stored column $A_0$. This routing may be accomplished using a dedicated connection (not shown) or, in a programmable logic device, using programmable interconnect resources of the device. Column $A_0$ can be overwritten because it has been stored in column vector store 102 for any further calculations for which it may be needed.

As also seen in FIG. 3, multiplexer 103, directed by control unit 113, selects column $A_1$ from input matrix store 101 and column $A_0$ from column vector store 102, and provides them as two inputs 321, 331, respectively, to multiplication/addition unit 104. Multiplication/addition unit 104 computes $rn_{0,1}$, at 302. Division/square root unit 105 operates on input 302 to compute $r_{0,1}$, at 303 (dividing by $r^2_{0,0}$, previously calculated).

Figure 4:
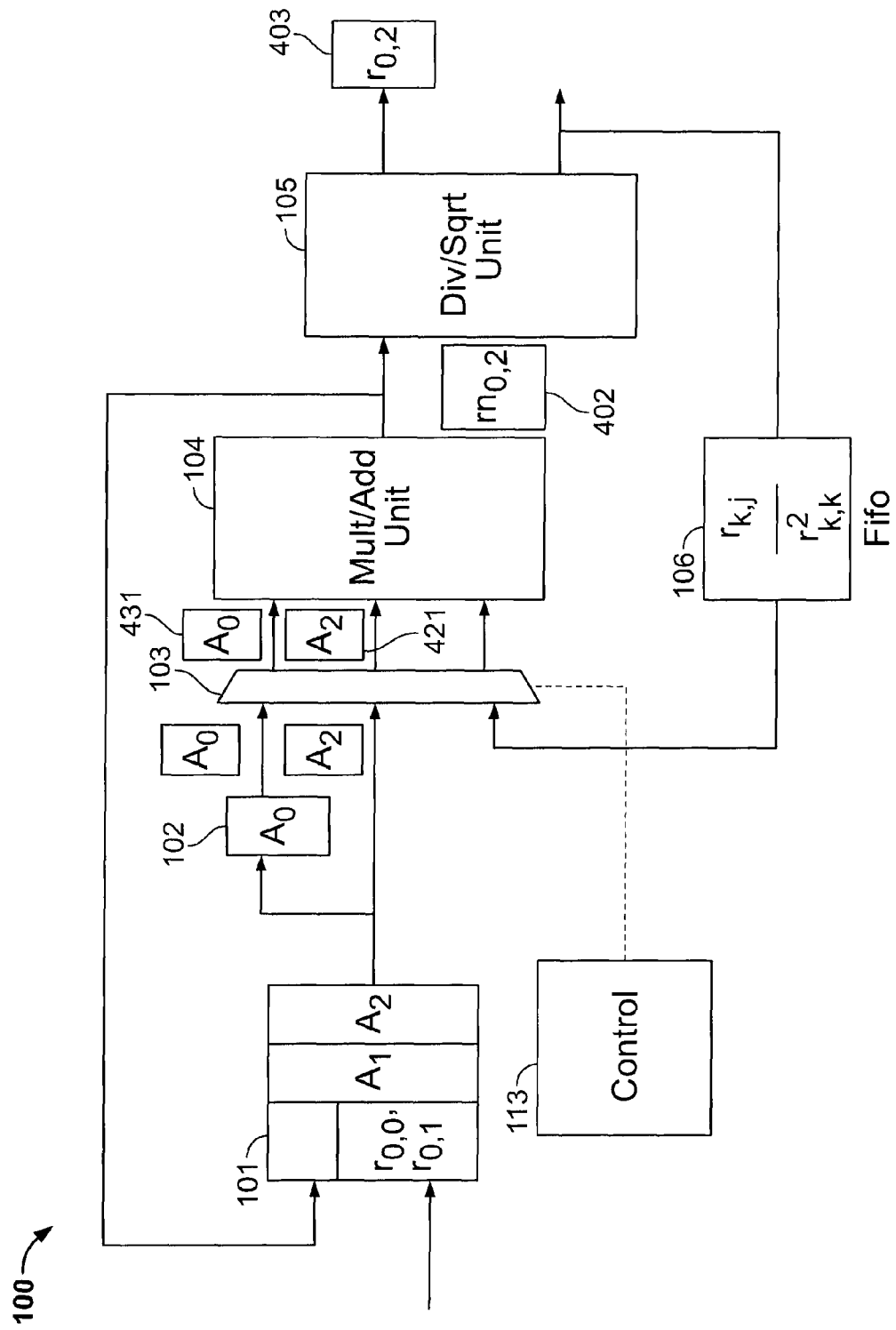
FIG. 4 shows another iteration through the circuitry of FIG. 1.

As seen in FIG. 4, $r_{0,1}$ has been routed back to input matrix store 101 and stored as an element of the column that originally stored column $A_0$. As in the case of $r_{0,0}$, this routing may be accomplished using a dedicated connection (not shown) or, in a programmable logic device, using programmable interconnect resources of the device.

As also seen in FIG. 4, multiplexer 103, directed by control unit 113, selects column $A_2$ from input matrix store 101 and column $A_0$ from column vector store 102, and provides them as two inputs 421, 431, respectively, to multiplication/addition unit 104. Multiplication/addition unit 104 computes $rn_{0,2}$, at 402. Division/square root unit 105 operates on input 402 to compute $r_{0,2}$, at 403 (dividing by $r^2_{0,0}$, previously calculated). $r_{0,2}$ may be fed back to input matrix store 101, completing Column R in this 3×3 example.

Figure 5:
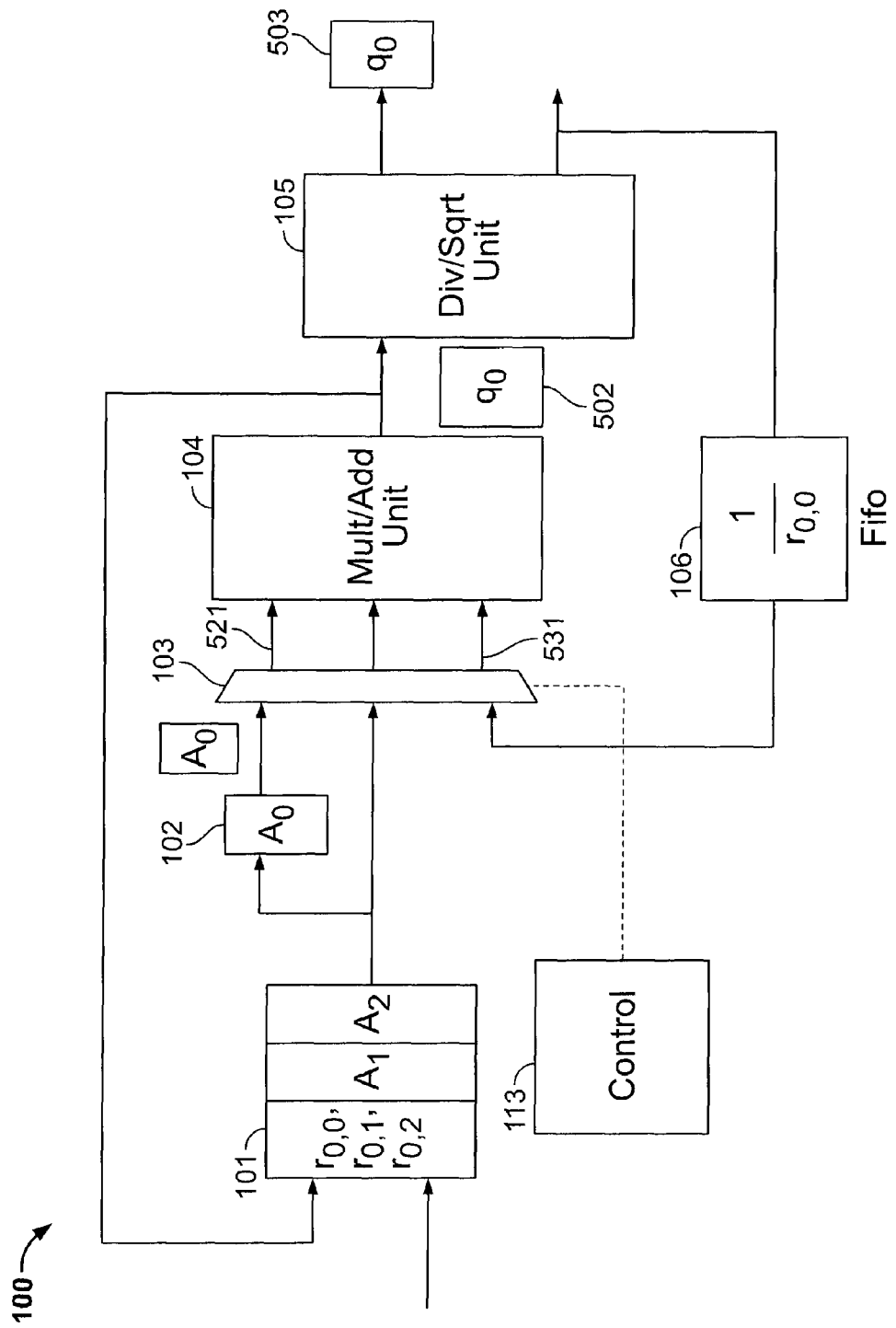
FIG. 5 shows another iteration through the circuitry of FIG. 1.

As seen above, within the outer loop—i.e., before the next k—if Q is needed, $Q_k$—in this case, $Q_0$—is computed by dividing $A_k$ (in this case, $A_0$) by $r_{k,k}$ (in this case, $r_{0,0}$). Thus, as shown in FIG. 5, multiplexer 103, directed by control unit 113, selects column $A_0$ from column vector store 102, and $1/r_{0,0}$ fed back from division/square root unit 105 through FIFO 106, and provides them as two inputs 521, 531, respectively, to multiplication/addition unit 104. Multiplication/addition unit 104 multiplies those inputs to compute $Q_0$, at 502, which is passed through division/square root unit 105 (divided by 1) and output at 503.

As also seen above, within the outer loop (index k) the next column of the input matrix A is modified by an inner loop (index j) as follows:

$$A(1:m,j)=A(1:m,j)-(rn(k,j)/r_2(k,k)) \cdot A(1:m,k)$$

Figure 6:
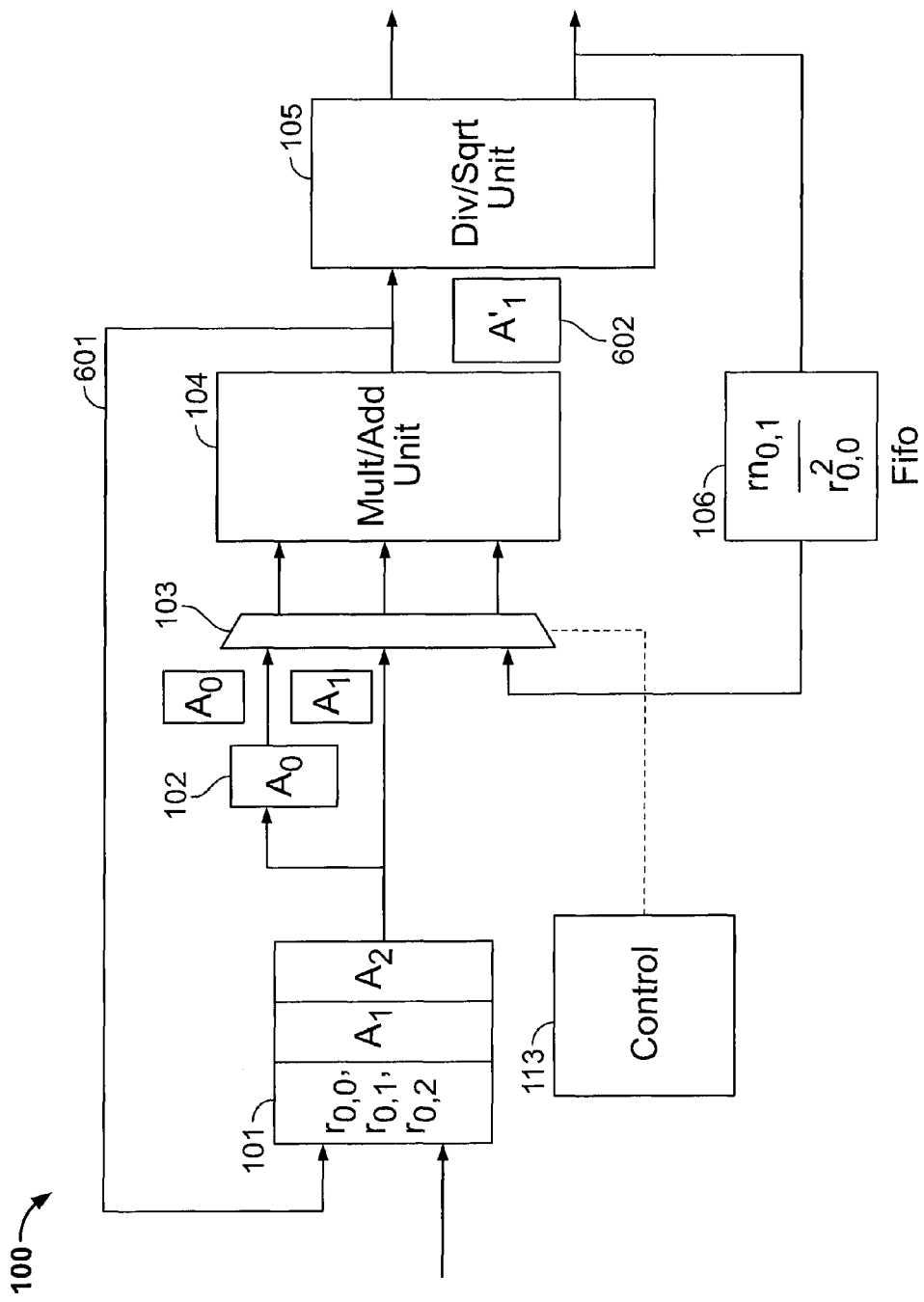
FIG. 6 shows another iteration through the circuitry of FIG. 1.

An embodiment of this operation is shown in FIG. 6 for the k=0; j=1 iteration. As seen in FIG. 6, multiplexer 103, directed by control unit 113, selects column $A_1$ from input matrix store 101 and column $A_0$ from column vector store 102, and provides them as two of the three inputs to multiplication/addition unit 104. As a third input, multiplexer 103, directed by control unit 113, selects $rn_{0,1}/r^2_{0,0}$, fed back from division/square root unit 105 through FIFO 106. From those three inputs, multiplication/addition unit 104 computes an updated column vector $A_1'$ at 602, which is fed back via feedback path 601 to input matrix store 101 and replaces original column $A_1$. In another iteration (not shown), the same process is used to replace original column $A_2$ with a new column $A_2'$. If there were more columns than are shown in this example, the subsequent columns would also be replaced. In a next iteration of the outer loop, this inner loop would result in the replacement of $A_2'$ with $A_2''$ (as well, in an example with more than three columns, as any additional "prime" columns of higher index with "double prime" columns). In yet another iteration of the outer loop in a case with more columns, this inner loop would result in the replacement of $A_3''$ with $A_3'''$ (and any additional "double prime" columns of higher index with "triple prime" columns). The next iteration of the outer loop would result in the replacement of $A_4'''$ with $A_4''''$, and so on. Of course, on each such iteration of the outer loop, the other computations described above would also be carried out.

In this embodiment, the just-described replacement of the columns of the input matrix is the last step in the outer loop. The next iteration of the outer loop would begin with the computation of the norm of the next columns of the modified input matrix A', replacing column $A_1'$ column with column $R_1$, including, in this 3×3 example, individual values $r_{1,1}$ and $r_{1,2}$. The various inner loops would then be carried out as above. The next iteration of the outer loop would begin with the computation of the norm of the next columns of the modified input matrix A'', replacing column $A_2''$ column with column $R_2$, including, in this 3×3 example, individual value $r_{2,2}$. The various inner loops would then be carried out again as above, which would be the final iteration in this 3×3 example. At that point R, and Q if needed, would have been calculated. It will be apparent, however, how embodiments of the invention can be used with larger matrices.

Figure 7:
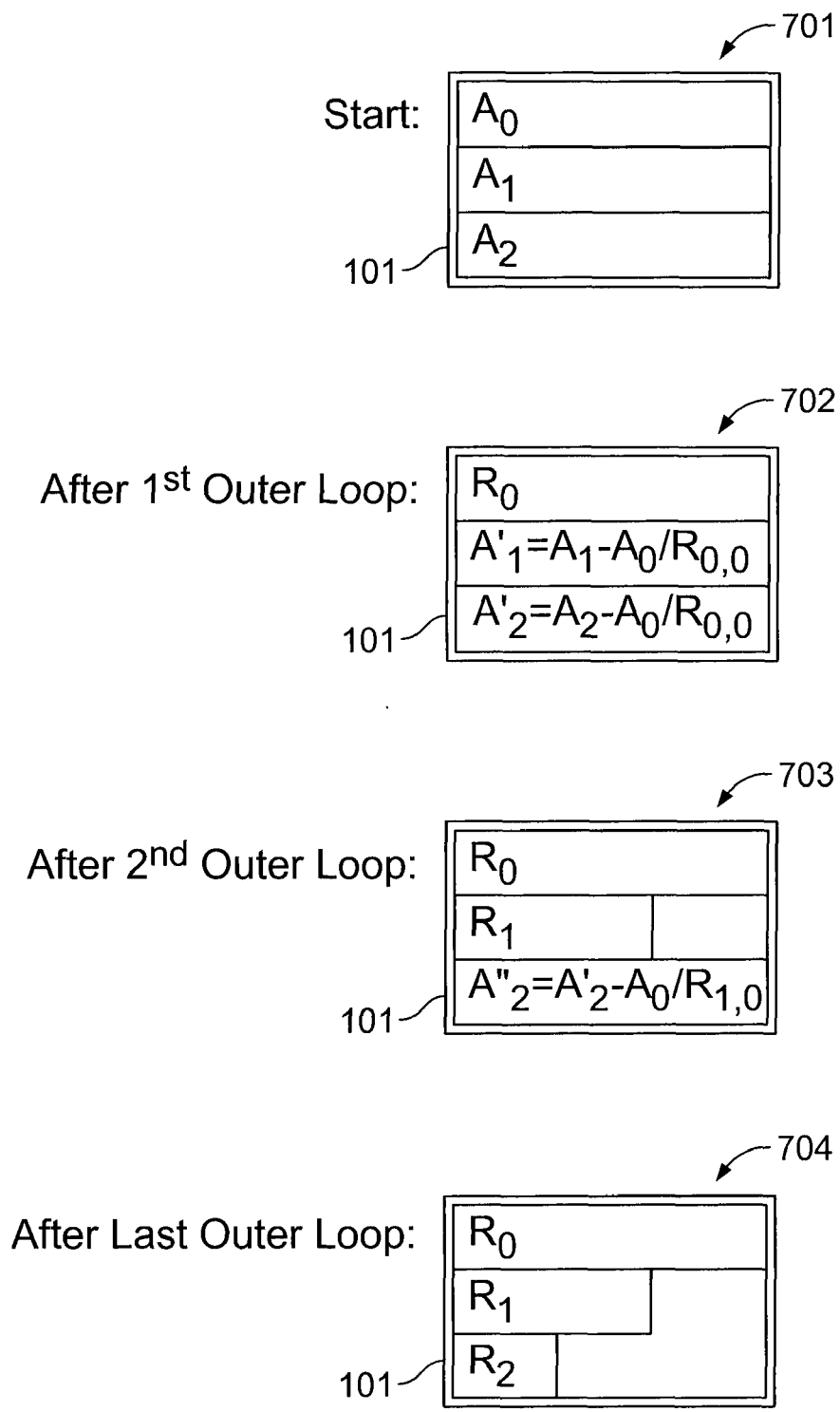
FIG. 7 illustrates memory usage according to one embodiment of a method according to the invention.
Figure 8:
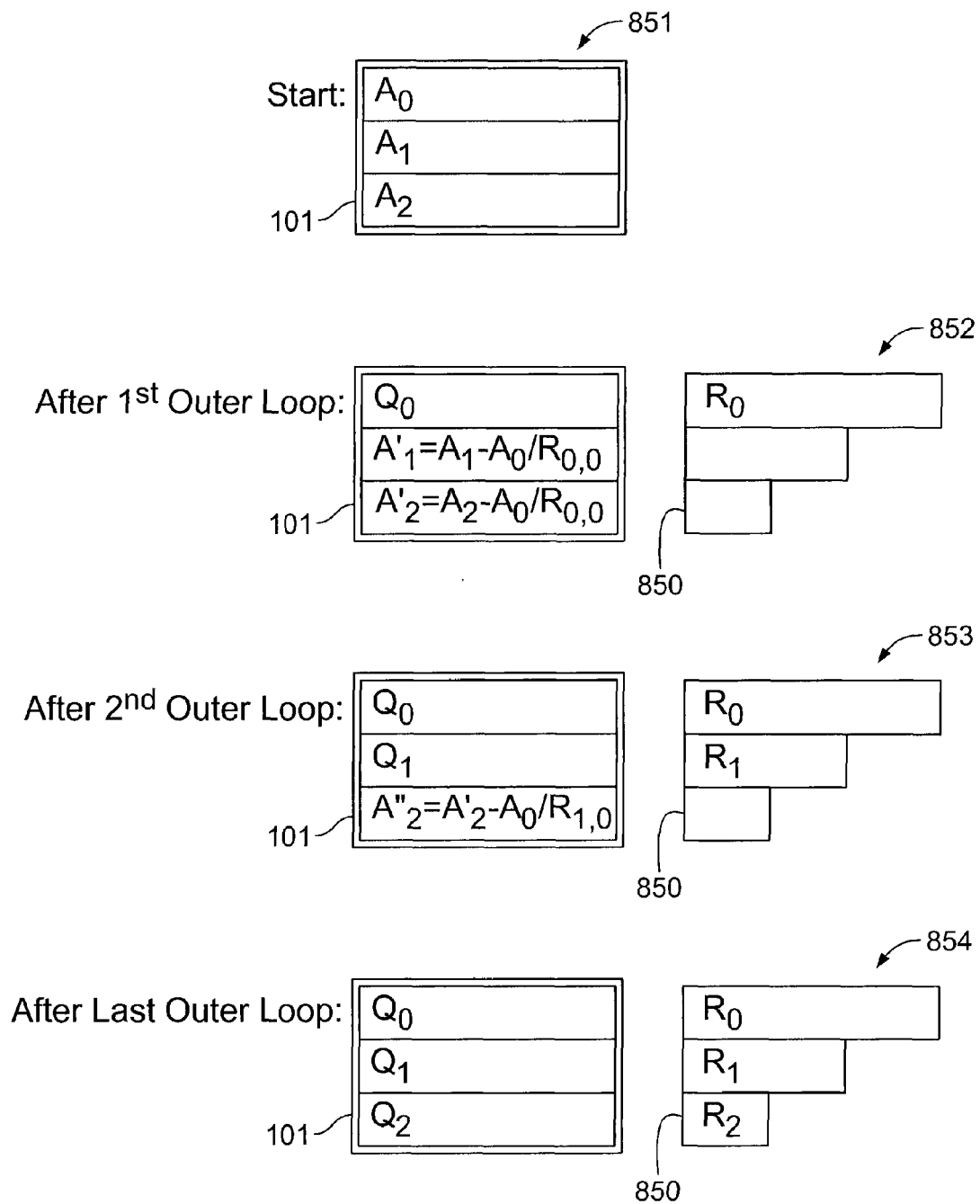
FIG. 8 illustrates memory usage according to another embodiment of a method according to the invention.

FIGS. 7 and 8 show the efficiency of memory usage according to the invention, using the foregoing 3×3 example as an illustration. FIG. 7 shows the case where the R matrix is computed but the Q matrix is not needed, while FIG. 8 shows the case where both R and Q matrices are computed. Thus, as seen at 701 in FIG. 7, input matrix store 101 includes the three columns (shown row-wise for ease of illustration) of input matrix A. As seen at 702, after the first outer loop, input matrix store 101 includes column $R_0$ of output matrix R, along with modified columns $A_1'$ and $A_2'$ of input matrix A. As seen at 703, after the second outer loop, input matrix store 101 includes columns $R_0$ and $R_1$ of output matrix R, along with modified column $A_2''$ of input matrix A. As seen at 704, after the third outer loop, input matrix store 101 includes all three columns $R_0$, $R_1$ and $R_2$ of output matrix R. By adding column vector store 102 in circuit 100, the need for a separate output memory for matrix R has been eliminated.

As seen at 851 in FIG. 8, input matrix store 101 again includes the three columns (shown row-wise for ease of illustration) of input matrix A. As seen at 852, after the first outer loop, input matrix store 101 includes column $Q_0$ of output matrix Q, along with modified columns $A_1'$ and $A_2'$ of input matrix A. Column $R_0$ has been moved into output memory 850. As seen at 853, after the second outer loop, input matrix store 101 includes columns $Q_0$ and $Q_1$ of output matrix Q, along with modified column $A_2''$ of input matrix A. Column $R_1$ has been moved into output memory 850 along with column $R_0$. As seen at 854, after the third outer loop, input matrix store 101 includes all three columns $Q_0$, $Q_1$ and $Q_2$ of output matrix Q. In this case, the addition of column vector store 102 in circuit 100 has not eliminated the need for a separate output memory, but by using input matrix store 101 for the larger output matrix Q, the additional memory 850 need only be as large as the smaller matrix R, which is essentially half the size of either input matrix A or output matrix Q.

Thus it is seen that circuitry and methods for performing QR decomposition with reduced data dependencies, and reduced memory requirements, has been provided. This invention may have use in hard-wired implementations of QR decompositions, as well as in software implementations in multi-core processors where data dependencies across processor cores may be a factor.

Another potential use for the present invention may be in programmable integrated circuit devices such as programmable logic devices, as discussed above, where programming software can be provided to allow users to configure a programmable device to perform matrix operations. The result would be that fewer logic resources of the programmable device would be consumed. And where the programmable device is provided with a certain number of dedicated blocks for arithmetic functions (to spare the user from having to configure arithmetic functions from general-purpose logic), the number of dedicated blocks needed to be provided (which may be provided at the expense of additional general-purpose logic) can be reduced (or sufficient dedicated blocks for more operations, without further reducing the amount of general-purpose logic, can be provided).

The calculations described above may be done as fixed-point calculations or floating-point calculations. If floating point calculations are used, the various operators used for the calculations described above can be configured in a programmable device using, e.g., the techniques described in commonly-assigned U.S. Pat. No. 7,865,541, which is hereby incorporated by reference herein in its entirety, which conserves resources by limiting the normalization of intermediate results, as described therein.

Instructions for carrying out a method according to this invention for programming a programmable device to perform matrix decomposition may be encoded on a machine-readable medium, to be executed by a suitable computer or similar device to implement the method of the invention for programming or configuring PLDs or other programmable devices to perform addition and subtraction operations as described above. For example, a personal computer may be equipped with an interface to which a PLD can be connected, and the personal computer can be used by a user to program the PLD using a suitable software tool, such as the QUARTUS® II software available from Altera Corporation, of San Jose, Calif.

Figure 9:
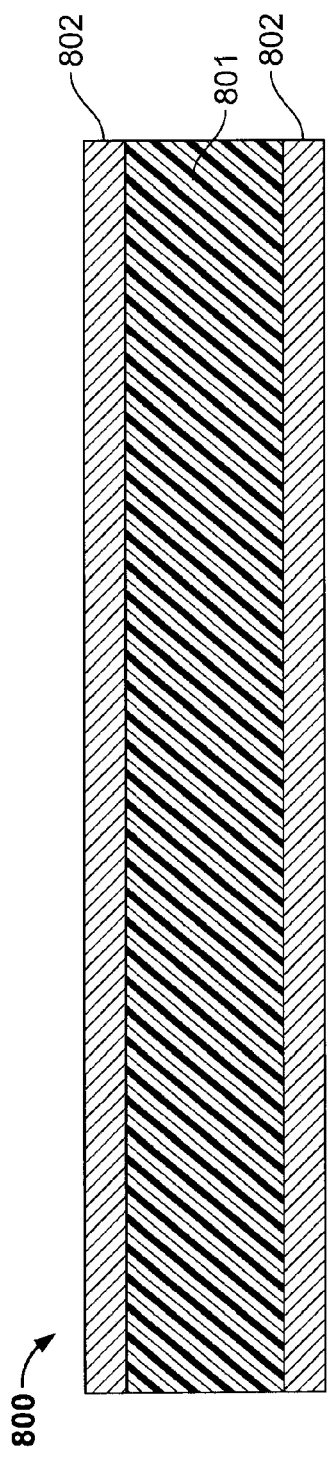
FIG. 9 is a cross-sectional view of a magnetic data storage medium encoded with a set of machine-executable instructions for performing the method according to the present invention.

FIG. 9 presents a cross section of a magnetic data storage medium 800 which can be encoded with a machine executable program that can be carried out by systems such as the aforementioned personal computer, or other computer or similar device. Medium 800 can be a floppy diskette or hard disk, or magnetic tape, having a suitable substrate 801, which may be conventional, and a suitable coating 802, which may be conventional, on one or both sides, containing magnetic domains (not visible) whose polarity or orientation can be altered magnetically. Except in the case where it is magnetic tape, medium 800 may also have an opening (not shown) for receiving the spindle of a disk drive or other data storage device.

The magnetic domains of coating 802 of medium 800 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

Figure 10:
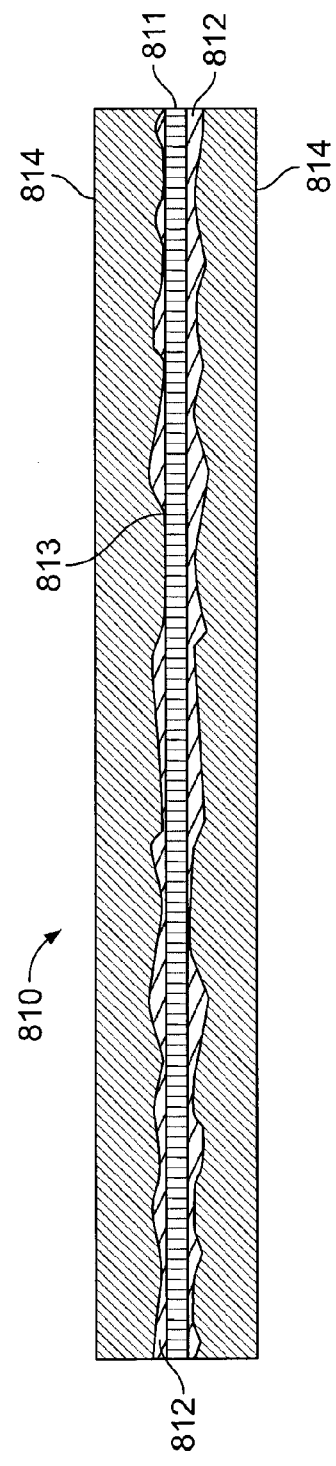
FIG. 10 is a cross-sectional view of an optically readable data storage medium encoded with a set of machine executable instructions for performing the method according to the present invention.

FIG. 10 shows a cross section of an optically-readable data storage medium 810 which also can be encoded with such a machine-executable program, which can be carried out by systems such as the aforementioned personal computer, or other computer or similar device. Medium 810 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 810 preferably has a suitable substrate 811, which may be conventional, and a suitable coating 812, which may be conventional, usually on one or both sides of substrate 811.

In the case of a CD-based or DVD-based medium, as is well known, coating 812 is reflective and is impressed with a plurality of pits 813, arranged on one or more layers, to encode the machine-executable program. The arrangement of pits is read by reflecting laser light off the surface of coating 812. A protective coating 814, which preferably is substantially transparent, is provided on top of coating 812.

In the case of magneto-optical disk, as is well known, coating 812 has no pits 813, but has a plurality of magnetic domains whose polarity or orientation can be changed magnetically when heated above a certain temperature, as by a laser (not shown). The orientation of the domains can be read by measuring the polarization of laser light reflected from coating 812. The arrangement of the domains encodes the program as described above.

Figure 11:
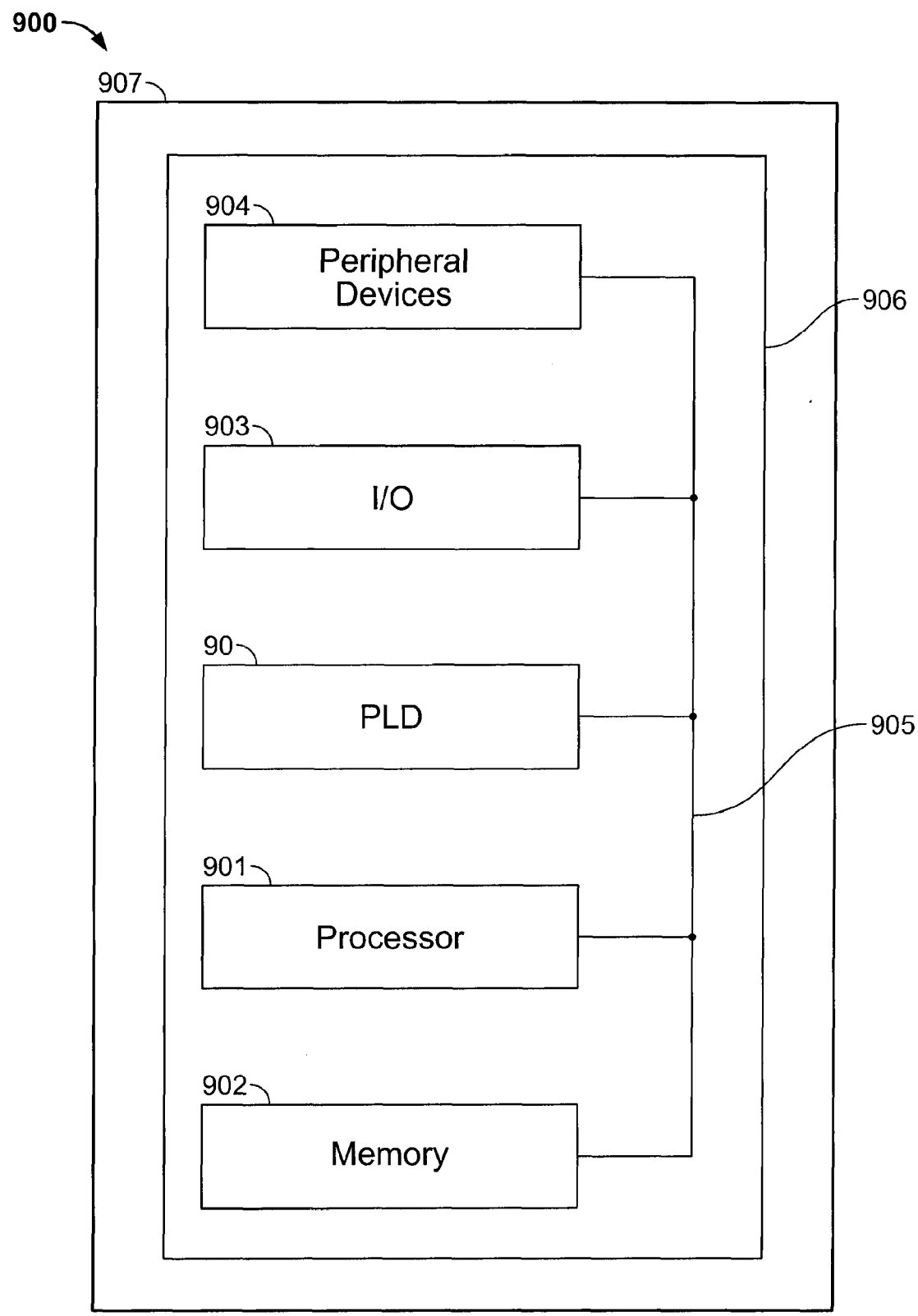
FIG. 11 is a simplified block diagram of an illustrative system employing a programmable logic device incorporating the present invention.

A PLD 90 programmed according to the present invention may be used in many kinds of electronic devices. One possible use is in a data processing system 900 shown in FIG. 11. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. Matrix processing circuitry for performing QR decomposition of an input matrix, said matrix processing circuitry comprising:
    multiplication/addition circuitry for performing multiplication and addition/subtraction operations on a plurality of inputs;
    division/square-root circuitry for performing division and square-root operations on an output of said multiplication/addition circuitry;
    a first memory for storing said input matrix;
    a second memory for storing a selected vector of said input matrix; and
    a selector for inputting to said multiplication/addition circuitry any one or more of a vector of said input matrix, said selected vector, and an output of said division/square-root circuitry; wherein:
    on respective successive passes:
    a respective vector of said input matrix is read from said first memory into said second memory, and
    said matrix processing circuitry computes elements of a respective vector of an R matrix of said QR decomposition and replaces said respective vector of said input matrix in said first memory with said respective vector of said R matrix; and
    after all vectors of said input matrix have been processed, said first memory contains an output matrix of said QR decomposition.

2. The matrix processing circuitry of claim 1 further comprising control circuitry controlling which one or more of said vector of said input matrix, said selected vector, and said output of said division/square-root circuitry, are input to said multiplication/addition circuitry.

3. The matrix processing circuitry of claim 1 further comprising a feedback memory for storing said output of said division/square-root circuitry for input to said selector.

4. The matrix processing circuitry of claim 3 wherein said feedback memory is a FIFO memory.

5. The matrix processing circuitry of claim 1 wherein said output matrix contained in said first memory is said R matrix.

6. The matrix processing circuitry of claim 1 further comprising:
    an output memory; wherein:
    said R matrix is stored in said output memory; and
    said output matrix contained in said first memory is a Q matrix of said QR decomposition.

7. A method of performing QR decomposition of an input matrix using an integrated circuit device, said method comprising:
    on respective successive passes:
    reading a respective vector of said input matrix from a first memory into a second memory; and
    computing elements of a respective vector of an R matrix of said QR decomposition and replacing said respective vector of said input matrix in said first memory with said respective vector of said R matrix; wherein:
    after all vectors of said input matrix have been processed, said first memory contains an output matrix of said QR decomposition.

8. The method of claim 7 wherein said output matrix contained in said first memory is said R matrix.

9. The method of claim 7 further comprising:
    outputting said R matrix to an output memory; wherein:
    said output matrix contained in said first memory is a Q matrix of said QR decomposition.

10. A method of configuring a programmable integrated circuit device as circuitry for performing QR decomposition of an input matrix, said method comprising:
configuring logic of said programmable integrated circuit device as multiplication/addition circuitry for performing multiplication and addition/subtraction operations on a plurality of inputs;
configuring logic of said programmable integrated circuit device as division/square-root circuitry for performing division and square-root operations on an output of said multiplication/addition circuitry;
configuring memory on said programmable integrated circuit device as a first memory for storing said input matrix;
configuring memory on said programmable integrated circuit device as a second memory for storing a selected vector of said input matrix;
configuring logic of said programmable integrated circuit device as a selector for inputting to said multiplication/addition circuitry any one or more of a vector of said input matrix, said selected vector, and an output of said division/square-root circuitry; and
configuring said circuitry for performing QR decomposition of an input matrix to, on respective successive passes:
read a respective vector of said input matrix from said first memory into said second memory, and
compute elements of a respective vector of an R matrix of said QR decomposition and replace said respective vector of said input matrix in said first memory with said respective vector of said R matrix; wherein:
after all vectors of said input matrix have been processed, said first memory contains an output matrix of said QR decomposition.

11. The method of claim 10 further comprising:
configuring logic of said programmable integrated circuit device as control circuitry controlling which one or more of said vector of said input matrix, said selected vector, and said output of said division/square-root circuitry, are input to said multiplication/addition circuitry.

12. The method of claim 10 further comprising:
configuring memory of said programmable integrated circuit device as a feedback memory for storing said output of said division/square-root circuitry for input to said selector.

13. The method of claim 12 comprising configuring said feedback memory as a FIFO memory.

14. The method of claim 10 wherein said output matrix contained in said first memory is said R matrix.

15. The method of claim 10 wherein:
said R matrix is stored in an output memory; and
said output matrix contained in said first memory is a Q matrix of said QR decomposition.

16. A non-transitory machine-readable data storage medium encoded with non-transitory machine-executable instructions for configuring a programmable integrated circuit device as circuitry for performing QR decomposition of an input matrix, said instructions comprising:
instructions to configure logic of said programmable integrated circuit device as multiplication/addition circuitry for performing multiplication and addition/subtraction operations on a plurality of inputs;
instructions to configure logic of said programmable integrated circuit device as division/square-root circuitry for performing division and square-root operations on an output of said multiplication/addition circuitry;
instructions to configure memory of said programmable integrated circuit device as a first memory for storing said input matrix;
instructions to configure memory of said programmable integrated circuit device as a second memory for storing a selected vector of said input matrix;
instructions to configure logic of said programmable integrated circuit device as a selector for inputting to said multiplication/addition circuitry any one or more of a vector of said input matrix, said selected vector, and an output of said division/square-root circuitry; and
instructions to configure logic of said programmable integrated circuit device to, on respective successive passes:
read a respective vector of said input matrix from said first memory into said second memory, and
compute elements of a respective vector of an R matrix of said QR decomposition and replace said respective vector of said input matrix in said first memory with said respective vector of said R matrix; wherein:
after all vectors of said input matrix have been processed, said first memory contains an output matrix of said QR decomposition.

17. The non-transitory machine-readable data storage medium of claim 16 further comprising:
instructions to configure logic of said programmable integrated circuit device as control circuitry controlling which one or more of said vector of said input matrix, said selected vector, and said output of said division/square-root circuitry, are input to said multiplication/addition circuitry.

18. The non-transitory machine-readable data storage medium of claim 16 further comprising instructions to configure memory of said programmable integrated circuit device as a feedback memory for storing said output of said division/square-root circuitry for input to said selector.

19. The non-transitory machine-readable data storage medium of claim 16 further comprising instructions to store said R matrix as said output matrix contained in said first memory.

20. The non-transitory machine-readable data storage medium of claim 16 further comprising:
instructions to configure memory of said programmable logic device as an output memory for storing said R matrix; and
instructions to store a Q matrix of said QR decomposition said output matrix contained in said first memory.

* * * * *